(12) United States Patent
Farnsworth et al.

(10) Patent No.: US 8,903,383 B2
(45) Date of Patent: Dec. 2, 2014

(54) METHOD IN A DEVICE, AND A WIRELESS DEVICE

(75) Inventors: Andrew John Farnsworth, Kidderminster (GB); Ozgur Ekici, Escondido, CA (US); Rene Faurie, Versailles (FR); David Philip Hole, Southampton (GB)

(73) Assignee: BlackBerry Limited, Waterloo (CA)

( * ) Notice: Subject to any disclaimer, the term of this patent is extended or adjusted under 35 U.S.C. 154(b) by 111 days.

(21) Appl. No.: 13/490,587

(22) Filed: Jun. 7, 2012

(65) Prior Publication Data

US 2013/0225169 A1    Aug. 29, 2013

(30) Foreign Application Priority Data

Feb. 24, 2012   (EP) ..................................... 12305222

(51) Int. Cl.
    *H04W 8/02*         (2009.01)
(52) U.S. Cl.
    USPC .......................................... 455/434; 455/436
(58) Field of Classification Search
    USPC ........... 455/422, 1, 423–425, 426.1, 435.1–2,
                   455/436–439, 445, 434; 370/331–332
    See application file for complete search history.

(56) References Cited

U.S. PATENT DOCUMENTS

| | | | |
|---|---|---|---|
| 6,067,460 A * | 5/2000 | Alanara et al. ................. | 455/574 |
| 6,393,279 B1 * | 5/2002 | Lee ............................. | 455/426.1 |
| 8,121,602 B2 * | 2/2012 | Yi et al. ......................... | 455/436 |
| 8,155,079 B2 * | 4/2012 | Kumpula et al. .............. | 370/331 |
| 8,428,637 B2 * | 4/2013 | Narang et al. ................. | 455/522 |
| 2004/0152480 A1 | 8/2004 | Willars et al. | |
| 2004/0192347 A1 * | 9/2004 | Leizerovich et al. ....... | 455/456.1 |
| 2005/0124349 A1 * | 6/2005 | Lin et al. ........................ | 455/450 |
| 2006/0041923 A1 * | 2/2006 | McQuaide .................... | 725/131 |
| 2006/0246895 A1 * | 11/2006 | Ryu .............................. | 455/434 |
| 2008/0002628 A1 | 1/2008 | Bi et al. | |
| 2010/0056131 A1 * | 3/2010 | Kelif .......................... | 455/422.1 |
| 2011/0117951 A1 * | 5/2011 | Lee .............................. | 455/513 |
| 2011/0151877 A1 * | 6/2011 | Tafreshi ....................... | 455/442 |
| 2012/0058760 A1 * | 3/2012 | Jang et al. .................. | 455/426.1 |
| 2012/0238271 A1 * | 9/2012 | Hanov .......................... | 455/436 |
| 2013/0084858 A1 * | 4/2013 | Ramasamy et al. .......... | 455/434 |
| 2014/0106752 A1 * | 4/2014 | Winter .......................... | 455/436 |

FOREIGN PATENT DOCUMENTS

| | | |
|---|---|---|
| EP | 1670278 A1 | 6/2006 |
| EP | 2111074 A1 | 10/2009 |
| EP | 2360969 A1 | 8/2011 |
| WO | 99/62285 A1 | 12/1999 |
| WO | 2007/023249 A1 | 3/2007 |

OTHER PUBLICATIONS

Extended European Search Report from related European Patent Application No. 12305222.7 dated Jan. 16, 2013; 17 pages.

\* cited by examiner

*Primary Examiner* — Cong Tran

(74) *Attorney, Agent, or Firm* — Fitch, Even, Tabin & Flannery LLP

(57) ABSTRACT

A method, and a wireless device, are disclosed; the method comprising monitoring a neighbor cell at a time interval; and if a criterion is satisfied, modifying monitoring of the neighbor cell.

38 Claims, 11 Drawing Sheets

METHOD IN A DEVICE, AND A WIRELESS DEVICE

TECHNICAL FIELD

This application relates to mobile telecommunications systems in general, and in particular to a method in a device, a wireless device, a data carrier, and a computer readable medium.

BACKGROUND

In a typical cellular radio system, mobile user equipment (UE) communicates via a radio access network (RAN) to a core network. User equipment (UE) comprises various types of equipment such as mobile telephones (also known as cellular or cell phones), laptops with wireless communication capability, personal digital assistants (PDAs) etc. These may be portable, hand held, pocket sized, installed in a vehicle etc. and communicate voice and/or data signals with the radio access network. They may or may not be human-operated (examples of non-human operated UEs being those for machine-type communications such as for remote monitoring or metering applications).

A radio access network covers a geographical area typically divided into a plurality of cell areas. Each cell area is served by at least one base station, which in UMTS may be referred to as a Node B. Each cell is typically identified by a unique identifier which is broadcast in the cell. The base stations communicate at radio frequencies over an air interface with the UEs within range of the base station. Several base stations may be connected to a radio network controller (RNC) which controls various activities of the base Stations. The radio Network controllers are typically connected to a core network.

UMTS is a third generation public land mobile telecommunication system. Various standardization bodies are known to publish and set standards for third generation public land mobile telecommunication systems, each in their respective areas of competence. For instance, the 3GPP (Third Generation Partnership Project) in addition to publishing and setting standards for UMTS, also publishes and sets standards for GSM (Global System for Mobile Communications); 3GPP2 (Third Generation Partnership Project 2) publishes and sets standards for CDMA (Code Division Multiple Access).

The 3GPP TS 45.008 Standard, version 10.1.0 (2011 May) describes measurements of cells of radio access technologies in sections 6.6.4 ff. The 3GPP TS 36.133 Standard, v10.3.0 (2011 June) in section 4.2.2. addresses measurements of intra-frequency E-UTRAN cells. The 3GPP TS 25.304 Standard, v10.1.0 section 5.2.6 ff describes measurements when in UMTS Idle mode. In addition 3GPP TS 25.133 Standard, v10.4.0 section 4.2 describes some performance requirements for cell reselection measurements. The specifications are referred to herein as the "Standard", and are incorporated herein by reference.

SUMMARY

The present invention is set out in the independent claims, with some optional features set out in the claims dependent thereto.

A method in a device and a wireless device are described herein; in addition to a data carrier and a computer readable medium.

According to one aspect, there is provided a method in a wireless device, comprising monitoring a neighbour cell at a time interval; and if a criterion is satisfied relating to a previous reselection or selection activity of the device, increasing the time interval at which the neighbour cell is monitored.

Preferably the criterion is a predetermined criterion. The method may further include determining a home cell or a home region for the device, a home cell or home region comprising a cell or a region that the device, currently or previously, has been camped on, or remained within, for longer than a collective and/or continuous period; or in relation to which the device has relatively low mobility; or when camped on or remaining in, the device is associated with relatively low data transfer.

Preferably the criterion comprises the device being camped on the home cell, or remaining within the home region. The region may comprise a geographical region defined by positioning measurements, coverage of a plurality of cells and/or transmitters; and/or an unlicensed spectrum access point coverage area. The criterion may relate to the device being camped on a cell for more than a period of time. The previous reselection or selection activity includes, within a time interval, reselection to a cell Y being relatively frequent and/or reselection to a cell Z being relatively infrequent; and in which increasing the time interval at which the neighbour cell is monitored comprises increasing the time interval of monitoring at least one neighbour cell other than cell Y; and/or increasing the time interval of monitoring of cell Z.

Preferably, the criterion is a predetermined criterion. Preferably, when monitoring the neighbour cell, the device is camped on a cell.

According to a further aspect, there is provided a method in a wireless device, that comprises: monitoring a neighbour cell at a time interval; and if a criterion is satisfied relating to a previous reselection or selection activity of the device dependent upon which cells have been previously reselected or selected to, modifying the neighbour cells monitored and/or increasing the time interval at which the neighbour cell is monitored.

According to another aspect, there is provided a method in a wireless device, comprising: monitoring a neighbour cell at a time interval; and if the device is configured for low access priority or data transmission modifying the neighbour cells monitored and/or increasing the time interval at which the neighbour cell is monitored.

Preferably the criterion relates to a day, or time of day; measurements of a cell the device is camped on; neighbour cell measurements; a message received from a network within which the device is operable; measurements of a cell upon which the device is camped; currently or previously, time collectively and/or continuously camped a cell within a predetermined time interval; a speed of a past reselection; or whether the device is stationary, in which stationary comprises physically stationary, sufficiently small movement to be servable by a single cell, or being unlikely to perform reselection.

Preferably, the criterion is a predetermined criterion. Preferably, when monitoring the neighbour cell, the device is camped on a cell.

Preferably the increasing and/or modifying is dependent upon the signal quality and/or strength of a cell the device is camped on, or data received, or expected to be received.

In another aspect, there is provided a wireless device configured to monitor a neighbour cell at a time interval; and if a criterion is satisfied relating to a previous reselection or selection activity of the device, increase the time interval at which the neighbour cell is monitored.

Preferably, the criterion is a predetermined criterion. Preferably, when monitoring the neighbour cell, the device is camped on a cell.

Preferably the criterion is a predetermined criterion. The method may further include determining a home cell or a home cell or home region for the device, a home cell or home region comprising a cell or a region that the device, currently or previously, has been camped on, or remained within, for longer than a collective and/or continuous period; or in relation to which the device has relatively low mobility; or when camped on or remaining in, the device is associated with relatively low data transfer.

Preferably the criterion comprises the device being camped on the home cell, or remaining within the home region. The region may comprise a geographical region defined by positioning measurements, coverage of a plurality of cells and/or transmitters; and/or an unlicensed spectrum access point coverage area. The criterion may relate to the device being camped on a cell for more than a period of time. The previous reselection or selection activity includes, within a time interval, reselection to a cell Y being relatively frequent and/or reselection to a cell Z being relatively infrequent; and in which increasing the time interval at which the neighbour cell is monitored comprises increasing the time interval of monitoring at least one neighbour cell other than cell Y; and/or increasing the time interval of monitoring of cell Z.

In another aspect, there is provided a wireless device configured to monitor a neighbour cell at a time interval; and if a criterion is satisfied relating to a previous reselection or selection activity of the device dependent upon which cells have been previously reselected or selected to, modify the neighbour cells monitored and/or increasing the time interval at which the neighbour cell is monitored.

Preferably, the criterion is a predetermined criterion. Preferably, when monitoring the neighbour cell, the device is camped on a cell.

Preferably the criterion relates to a day, or time of day; measurements of a cell the device is camped on; neighbour cell measurements; a message received from a network within which the device is operable; measurements of a cell upon which the device is camped; currently or previously, time collectively and/or continuously camped a cell within a predetermined time interval; a speed of a past reselection; or whether the device is stationary, in which stationary comprises physically stationary, sufficiently small movement to be servable by a single cell, or being unlikely to perform reselection.

Preferably the increasing and/or modifying is dependent upon the signal quality and/or strength of a cell the device is camped on, or data received, or expected to be received.

Further, there is provided a wireless device configured to monitor a neighbour cell at a time interval; and if the device is configured for low access priority or data transmission modify the neighbour cells monitored and/or increasing the time interval at which the neighbour cell is monitored.

Preferably, the criterion is a predetermined criterion. Preferably, when monitoring the neighbour cell, the device is camped on a cell.

Preferably, there is provided a device comprising a component further configured to carry out the method as described herein.

There is also provided a carrier carrying data comprising instructions executable by processing means to cause those means to carry out a method as described herein.

There is also provided a computer readable medium having computer executable instructions adapted to cause the device to perform a method as described herein.

BRIEF DESCRIPTION OF THE DRAWINGS

Embodiments will now be described, by way of example only, with reference to the attached drawings, in which.

The same reference numerals are used in different figures to denote similar elements.

DETAILED DESCRIPTION

Figure 1:
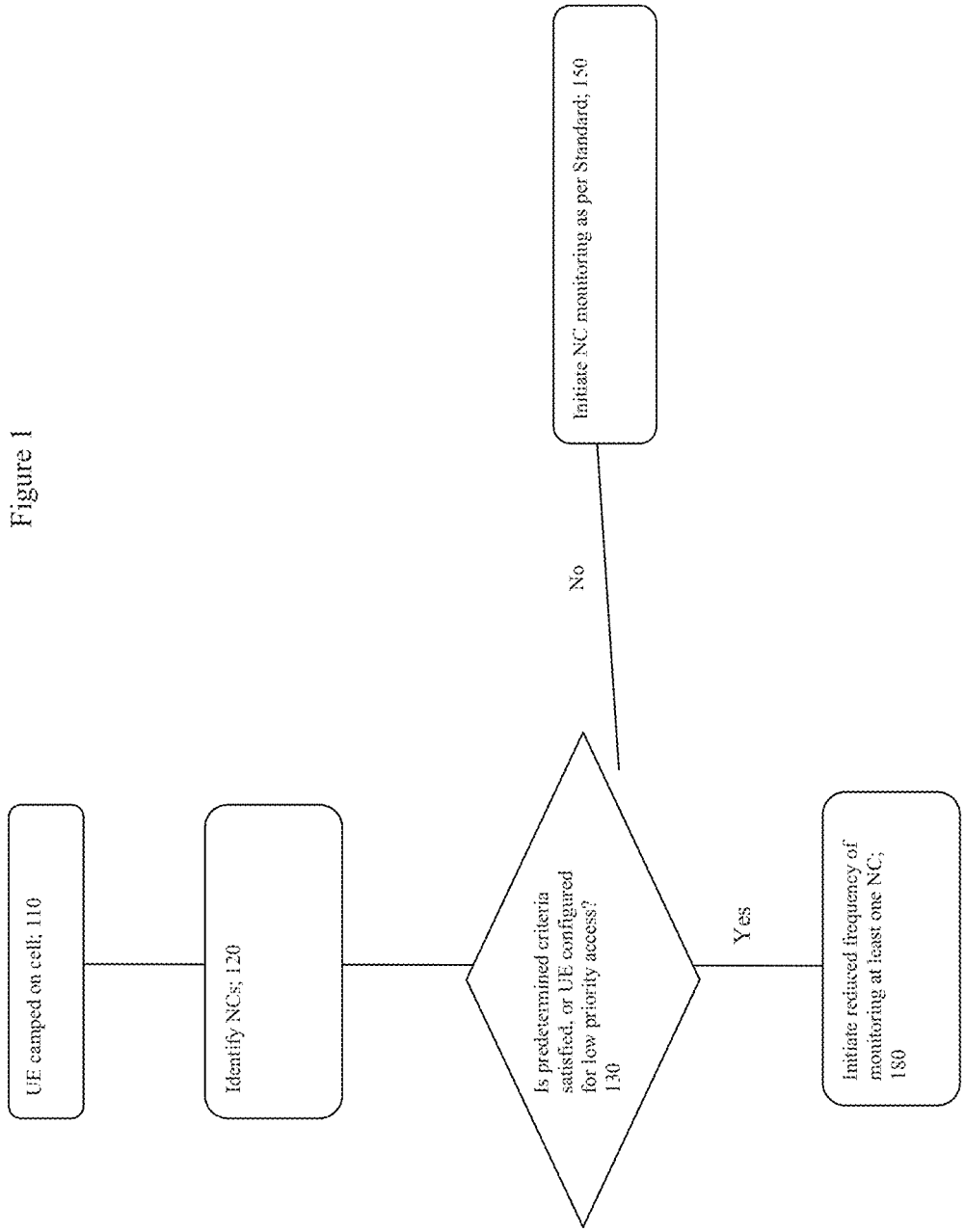
FIG. 1 is a flow diagram illustrating steps performed according to a first aspect of the approach described herein.

In the following description, for the purposes of explanation, numerous specific details are set forth in order to provide a thorough understanding of the new, inventive, and non-obvious concepts disclosed herein (hereinafter "concepts" or "concept"). It will be apparent, however, to one skilled in the art that the technique may be practised without these specific details. In other instances, well-known structures and devices are shown in block diagram form in order to avoid unnecessarily obscuring the concepts disclosed herein.

The needs identified in the foregoing Background, and other needs and objects that will become apparent from the following description, are achieved by, in one aspect, a method and apparatus for wireless communication. In other aspects, the concept encompasses a wireless telecommunication device and a computer-readable medium configured to carry out the foregoing actions, as well as a data carrier carrying thereon or therein data indicative of instructions executable by processing means to cause those means to carry out the foregoing actions. Examples are CD-ROMs, memory sticks, dongles, transmitted signals, downloaded files etc. In particular, the method may be implemented in a mobile telecommunications device, with or without voice capabilities, or other electronic devices such as handheld or portable devices.

Overview

An overview is now given of existing problems and how they are addressed according to the approaches described below. In the Figures, like reference numerals denote like components/messages and are not described unless repetition is required.

User equipment (UE) mobility within a network, such as, for example, a Universal Terrestrial Radio Access Network (UTRAN), may be either UE controlled or network controlled. For example, in the case of a UTRAN network, UE controlled mobility is used in Idle mode and the states CELL_PCH, URA_PCH, CELL_FACH of Radio Resource Control (RRC) Connected mode and network controlled mobility is used in the CELL_DCH state of RRC Connected mode.

Generally, cell changes are for the purpose of ensuring continued service when the UE moves. However, cell changes may also happen for other reasons (for example, reduction or increase in interference may make one cell preferable to another, even when the UE does not move).

In many cases, a change of serving cell by a UE is carried out by the UE autonomously or, in some specific cases, semi-autonomously. This is generally the case in idle mode, and is performed based on RF measurements of signals transmitted by the serving cell and one or more Neighbour Cells (NCs).

In the case of UE controlled mobility, the UE chooses a serving cell on which to 'camp' by the processes of cell selection and cell reselection. Cell selection is the process of choosing a serving cell when the UE does not currently have a serving cell (for example, when the UE has been first switched on, or when the UE is returning from loss of network coverage). Cell reselection is the process of changing from one serving cell to another serving cell. Typically the cell reselection process involves performing measurements of the signal strength and/or signal quality of a number of candidate neighbour cells and, in some cases, the serving cell, and then reselecting to one of the neighbour cells that is determined to offer sufficient signal strength and/or quality (possibly relative to that of the current serving cell).

The network may facilitate such measurements by transmitting system information which may include a list of parameters corresponding to the neighbour cells, such as cell carrier frequency, scrambling code, etc. GERAN cells may be identified by their BCCH carrier frequency and, optionally, by their base station identification code (BSIC). UTRAN cells may be identified by their carrier frequency and primary scrambling code (PSC); E-UTRAN cells by their carrier frequency and physical cell identity (PCI). Neighbour cell information may simply list carrier frequencies rather than identify individual cells. Neighbour cell information may also indicate forbidden ("not allowed") cells. The cells in a wireless network can be on the same or different frequencies; or even can use different radio access technologies (RATs), and neighbour cell lists may correspondingly indicate cells or frequencies of different RATs.

The system information may include neighbour cell lists to identify the carrier frequency and identity of candidate neighbour cells for cell reselection, and may also include various offsets, thresholds, priorities, timer values and other parameters to allow the network to control or influence the UE's cell reselection behaviour. For example, in a UTRAN cell, the broadcast Master Information Block (MIB) and System Information Block (SIB) Type 3, 4, 11, 11bis, 12, 18, and 19 messages may contain information related to cell reselection. SIBs are repeatedly transmitted on the Broadcast Control Channel (BCCH) of every UTRAN cell. This information may also be provided to a UE in point-to-point (i.e. non-broadcast) signalling.

It is noted that measuring or monitoring neighbour cells refers generally to the process of detecting and performing RF level measurements (signal strength and/or quality) in respect of a particular cell. In some cases, multiple cells operating on the same carrier frequency can be detected and/or measured almost simultaneously. As such, monitoring a 'set of neighbouring cells' may refer to monitoring their corresponding frequencies (noting that multiple cells may operate on the same frequency).

A device complying with the existing Standard is required to measure many, if not all, of the neighbour cells (which may be inter-RAT, inter-frequency and/or intra-frequency neighbours) that are defined in system information.

Constantly measuring neighbour cells (NCs) has non-trivial cost (increased battery consumption) on UEs. Often, cell reselection is not imminent, and even when it is about to happen, only a small number (possibly only 1) of the measured cells is a reasonable candidate cell. However, due to the existing requirements, neighbour cell measurements are performed, based on cell re-selection/measurements parameters, regardless, despite (in many cases) the high cost and battery drain, and little benefit.

In summary, measuring neighbour cells (NCs) in instances where this may not be necessary has non-trivial cost on UEs.

It is recognised here that the network cell re-selection/neighbour cell measurement parameters are configured without taking into account individual subscriber mobility profiles. For instance, in a given cell, the cell reselection parameters present in system information blocks will be read by all the UEs regardless of their location within the cell, mobility etc.

The present approach broadly relates to measurements of neighbour cells performed by the device for the purpose of device-initiated reselection, and it is applicable to devices whether they are handheld/human-usable/machine-type etc. For example, the approach is applicable to phones, tablet computers etc. and to smart meters, remote sensing devices, tracking devices, etc.

The approach recognises that a wireless device can have awareness of its previous reselection activity or mobility patterns, and as such can be configured to access historical mobility activity and connection information like cell reselection, duration camped in a cell, handover etc.

It will also be aware, or will be informed whether, it is configured for low access priority/data transmission or a similar subscription or device characteristic or feature, for example, by means of subscription management solutions as specified in 3GPP TS 23.888. As such, the UE may receive an indication that it is configured (or operate in accordance with) one or more MTC (machine-type communications) features, such as low access priority based on the subscription associated with its USIM. In this description, 'low access priority' is used as an example of such a characteristic, in possible combination with other examples including low mobility mode of operation; battery saving mode of operation; or delay tolerant mode. Configuration is, for example, by means of OMA DM or OTA SMS, for example. A determination (identification) of whether the UE is configured in such a way may involve comparison with signalling from the network at some point. It may be a dynamic configuration.

The scope of this invention (when directed to a "device") is not limited to a "User Equipment" as defined in 3GPP specifications, but may also include other devices such as one exclusive of a SIM or USIM but which may incorporate a SIM or USIM, for example in the form of a removable card (such as a UICC). In such cases, the device may receive an indication that the device is to be configured to operate in accordance with a particular characteristic or in a particular mode as described above from the SIM or USIM or other application on an inserted or embedded UICC; furthermore, according to the invention, the SIM or USIM may receive an indication from the network (including the case where the indication is received from the network via the host device) and subsequently may indicate this to the device. Some example, non limiting, definitions of terms are given below in Table 1:

TABLE 1

| | | |
|---|---|---|
| ME | Mobile Equipment | The portion of a UE excluding the UICC/(U)SIM. |
| UICC | Universal Integrated Circuit Card | Better known as the SIM card in telecommunications. UICC generally refers to the platform (hardware and operating software environment) on which (U)SIM and other applications may reside. |
| eUICC | Embedded Universal Integrated Circuit Card | UICC that is not intended to be disconnected from the ME. |
| (U)SIM | (Universal) Subscriber Identity Module | Functional component or application that resides on a UICC or eUICC. SIM often represents the module (i.e. physical card and application) originally specified for securely accessing services in networks using "2G" (GSM/EDGE) technology, while USIM refers to the application part residing on a (e)UICC platform and allowing the access to services in networks that could be of different radio access technologies (e.g. GSM/EDGE and UTRAN). |

If the UE is aware that it is configured for low access priority/data transmission, or that it fulfils a criterion relating to previous reselection activity/mobility patterns (for instance, the serving cell is one on which the UE often camps for significant periods of time (e.g. when the UE is on the desk in the office or at the bedside at home)), then the UE can autonomously reduce neighbour cell measurements to those considered as essential (for instance the UE can reduce the frequency of monitoring at least one of the neighbour cells and/or the number of cells monitored) with little or no noticeable performance impact. This provides improved battery life.

This can also benefit the network operator, by reducing ping-pong phenomena where a UE can decide to stay on a cell when experience indicates it is good enough and reselection won't help. Reduced ping-pong is especially important for the networks using CELL_PCH state and for the UEs camped on the routing-area or location-area border: in CELL_PCH state the UE is known at cell level and whenever the UE performs cell re-selection it has to report it to the network (via CellUpdate). This is not the case in IDLE or URA_PCH states. Similarly, devices which perform reselection to a cell in a new registration area (routing area or location area, or in the case of URA_PCH, Utran Routing Area) are required to inform the network.

Low mobility includes when the UE is 'effectively stationary' so that it would not (or would be unlikely to) perform cell reselection. This includes the case where it is physically stationary (noting that even in this case, reselection may be necessary if cell borders move, e.g. in the case of "cell breathing" phenomenon, and/or cells are reconfigured) and the case where the UE moves within the cell coverage but maintains really strong serving cell signal strength. A device may also be considered 'effectively stationary' if its movement is sufficiently small that it can be effectively served by a single cell.

According to the present approach therefore, the priority configuration, or mobility profile, of a UE is used to effectively prioritize NC measurements and autonomously disable/reduce unnecessary NC measurements that provide little or no value to UE mobility performance. The UE can access full information about its reselection activity and mobility patterns and can make more educated decisions regarding neighbour cell measurement prioritization/activation.

As further discussed below, the UE can utilize different algorithms to identify primary cells on which it spends considerable amount of time. For instance a UE can keep track of at least one or more of: the length of time on which it camps on a cell; the number of cell selections (e.g. at CONNECTED to IDLE mode transitions) towards a given cell; or reselections performed towards a given cell.

After finding the primary cells, which can be referred to as home cells, on which the UE spends a lot of time, the UE can use different algorithms to reduce/prioritize NC measurements. As an example, the UE can short-list the NCs to be measured considering their historic frequency of re-selection from the serving cell.

In summary, the benefits of the proposed solution is the reduced power consumption of the UE and reduced network signalling in specific network configurations by avoiding ping-pong between serving cells (if the network operator deployed CELL_PCH or if the UE happened to be camped on cells near location area, routing area, or UTRAN registration area (URA) borders). Considering the fact that the UE spends considerable amount of time in home cells, the battery savings may be significant. The amount of the battery saving will also depend on the DRX cycle configured in the network. Considering the fact that more and more network operators tend to use shorter DRX cycles (to increase paging capacity and to reduce the latency and mobile terminated call set-up times), the benefits of the proposed approaches are enhanced.

EXAMPLE 1

According to a first example, a UE determines when it can reduce a frequency of monitoring of neighbour cells, for cell reselection measurements, and when determined, initiates reduced frequency of monitoring at least one of the neighbour cells.

This example is illustrated in FIG. 1. In step 110, the UE is camped on a cell, where in one aspect, the UE is camped on a cell such that the UE is capable of monitoring neighbouring cells for reselection. The UE at step 120 then identifies neighbour cells for reselection measurements, which include a neighbour cell list indicating candidate cells/frequencies/RATs. In one aspect, the list may be received in broadcast system information, or the UE can "blind" scan to obtain related information, or a combination of both. The UE may in one aspect (not shown) acquire reselection parameters (such as thresholds, priorities etc.). In an alternative, no parameters are acquired, the parameters may be fixed, or may be UE implementation-dependent.

In step 130, there is a determination of whether a predetermined criterion is satisfied (where the predetermined criterion relates to the UE's previous mobility patterns), or whether the UE is configured for low access priority/data transfer. If the predetermined criterion is not satisfied and the UE is not configured for low access priority/data transfer, then in 150 the UE initiates monitoring neighbouring cells (cell reselection measurements) as per the Standard.

If the predetermined criterion is satisfied, then, then in 180 the UE initiates reduced monitoring of at least one of the neighbour cells (reduced frequency of monitoring/performing cell reselection measurements). In this case, the reduced monitoring can be an increase in the time between measurements compared to network signalling indications, and/or previous monitoring times. That is, there is a reduced frequency of monitoring. In another example, the reduction can be a cessation. One method of reducing measurements is to measure some or all NCs at a reduced frequency, or possibly not at all. Another method, further discussed below, is to use information about past reselections, and to tune the NC list that is broadcast for all UEs, and use the tuned/prioritised version which is effectively a UE specific neighbour cell list.

The (in this example, predetermined) criterion may relate to, for example:
  Measurements relating to the serving cell (the cell the UE is camped on). For example, if the serving cell signal strength and/or quality is high, reduced measurements are permitted.
  Measurements of neighbouring (non-serving) cells. For example, if one or more next cells are detectable (in one example, with good signal strength/quality), reduced measurements are permitted for other NCs.
  Day and/or time of day. If historical data indicates that imminent reselection is unlikely at this time, reduced measurements are permitted. For example, fixed data could be used, or used in addition. In one example, a UE which is only active at certain times of day (for example, because it is used in a specific environment which operates during specific hours, such as an airport), and this is used to determine when reduced measurements can be used.
  User input.
  Duration since last user-plane data was transferred (where the user-plane excludes radio link/radio resource control messages.) For example, if no user-plane data has been transferred in a previous interval, then reduced measurements are permitted.
  Based on explicit network permission/signalling.
  Based on the speed of past reselection(s).
  Based on whether the UE is stationary.

Regarding the speed of the actual subsequent reselection, when performed, in this case the UE may also take into account historical information regarding how long it took for reselection to occur, e.g. starting from when a candidate cell is first detected, or from when the serving cell signal quality/strength drops below a certain threshold. Correspondingly, this information may be used as the basis for setting/modifying the frequency of neighbour cell measurements.

EXAMPLE 1a

Used in conjunction with example 1, where the condition for reduced monitoring is dependent upon satisfying a predetermined criterion, the method of example 1a includes determining/identifying a home cell or a home region for the UE.

This is a cell or region upon which, or within which, generally the UE spends a significant amount of time.

Figure 2:
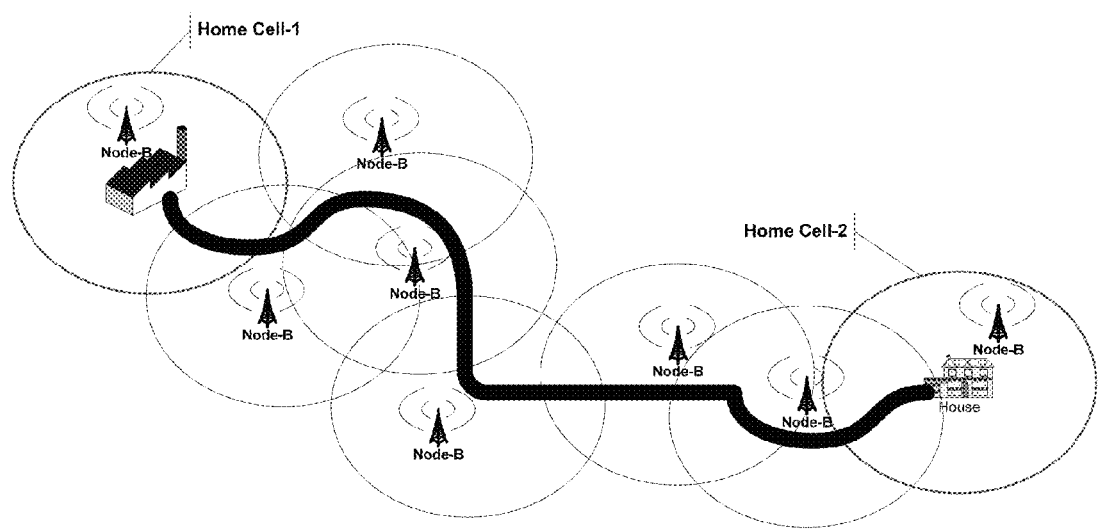
FIG. 2 is a diagram illustrating a mobility pattern of a device as described herein.

FIG. 2 shows a typical wireless radio network deployment and a sample travel pattern of a mobile user. It is common to see a typical smart phone user spending considerable amount of time at home and at work; and relatively less amount of time for transportation in between. Therefore, during the course of a day, a typical mobile user will be mostly under the coverage of only limited number of cells, which are providing wireless services and coverage to the end user's home and office/work. In FIG. 2, the cells the UE spends considerable amount of time are the two outermost cells to the left and right of the FIG. 2. These are referred to as "home cells". The "home cell" term does not necessarily mean Femto or Home Node-B cells that are defined in 3GPP (though such cells may be 'home cells').

A typical wireless device may be being served by one of only a limited number (e.g. 2 or 3) of "home cells". These cells are generally the ones that provide coverage to end user habitat like his/her work place and home. Similar considerations apply to machine-to-machine devices, which may be either entirely stationary, or more 'nomadic' (i.e. moving from one location to another, but remaining stationary for very long periods of time). Furthermore, battery consumption in these devices may be much more of a concern than it is for personal devices.

In a further example, a UE can keep track of cell usage of N cells+the current serving cell. The current cell can be in the tracked list of N cells or not. If the current cell is not in the list of N cells and is camped on for more than the lowest time for a cell in the list, then the last cell in the list can be dropped and the current cell can be added to the list. These key performance indicators (KPIs) can be evaluated for every 24 hour period and reset at midnight. To propagate the data collected to longer durations, a recursive filter with a forgetting factor can be used. For example let $X^{C1}(n)$ denote the cell usage KPI of cell C1 for day n (the n'th 24 hour period). At the end of the day n+1, the same KPI of the cell C1 can be estimated by $X_{est}^{C1}(n+1)=\alpha X^{C1}(n+1)$, where "$0 \leq \alpha \leq 1$" is the forgetting factor.

The number of the cells in the keep-track list (N) as well as the forgetting factor ($\alpha$) can be tailored relative to communication environment (e.g. urban environments would have more cell changes) and user mobility profile.

With respect to the identification, characterization and storing of one or more "home cell(s)", a "home region" may be defined instead, in an alternative example, corresponding to an office building say, identified by multiple cell identifiers.

The behaviour defined for the 'home cell' or home region may also be used in a location determined other than by cell ID e.g. by GPS coordinates. Due to the fact that GPS may require additional power consumption, this may be, for example, be limited to scenarios/applications where GPS information is required for purposes other than determining whether the UE is in a home region or not.

The principle means of identifying a home cell is thus by observing, over a period of time (preferably days) that a UE spends a significant amount of time being served by a particular cell.

Although the reduced monitoring is not applicable during "active" mode (such as CELL_DCH connected mode), the tracking of mobility for the purposes of identifying home cell(s) may include cells which are serving cells or active set cells in active mode.

Examples of how the home cell or home region are defined can be in relation to the UE's mobility profile and/or data transfer characteristics. The definition may include:
  A cell/region in relation to which the UE has low mobility. Low mobility may include a device which is unlikely to perform cell reselection. This would cover where a device is physically stationary, and also where it moves so little it is effectively served by the same cell.

A cell may be designated as a home cell based only on the current duration for which the UE has been camped on that cell—without regard for previously-visited cells or previous visits to the currently-serving cell.

A cell/region that the device, currently or previously, has been camped on or camped in for longer than a continuous and/or cumulative predetermined period within a further predetermined period of time.

For example, in the past 72 hours, the mobile station has been camped on the serving cell for more than 12 hours in total. Alternatively the mobile station has in the past 72 hours performed cell reselection and/or cell selection to the current serving cell more than 20 times and spent on average at least 10 minutes camped on the serving cell prior to reselection. Or, the mobile station has been camped in the serving cell continuously for more than 30 minutes.

According to this example, when it is determined that the device is camped on the home cell or is in the home region, the UE initiates modified cell reselection measurements.

Figure 3:
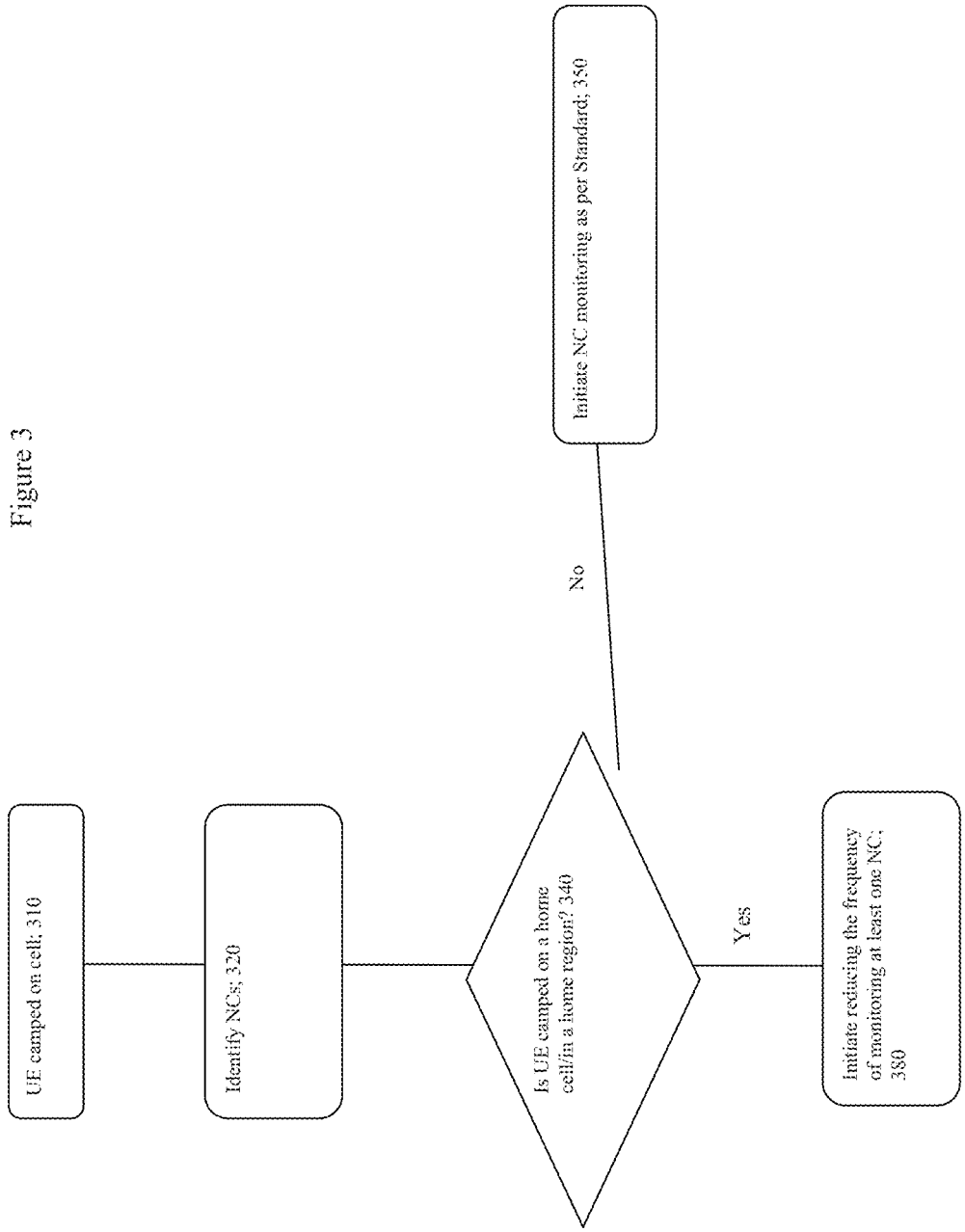
FIG. 3 is a flow diagram illustrating steps performed according to a further aspect of the approach described herein.

This is illustrated in FIG. 3. In step 310, the UE is camped on a cell. The UE at step 320 then identifies neighbour cells for reselection measurements, which include a neighbour cell list indicating candidate cells/frequencies/RATs.

In step 340, there is a determination of whether the UE is camped on a home cell/is within a home region. If there is a negative determination, then in 350 the UE initiates monitoring neighbouring cells (reselection measurements) as per the Standard.

If the UE is camped on a home cell or is in a home region, then in 380 the UE initiates reduced frequency of monitoring of at least one of the neighbour cells (reduced frequency of cell reselection measurements).

Regarding the home region, this term may be used to denote a geographic region specified in terms other than coverage of an individual network cell. For example, the region may be defined in terms of:

coordinates (i.e. to be verified based on GPS measurements or similar);

coverage of multiple cells (so the region covers multiple cells); or coverage of one or more further cells (i.e. not the serving cell) or transmitters (including transmitters using unlicensed spectrum, such as WLAN/IEEE 802.11- or "WiFi"—access points or including transmitters using licensed spectrum, such as personal cells like Femtocells). For example, a cell the UE is camped on at home may also cover a motorway running nearby. The home region may not be defined as based on the serving cell, since when a user of the UE is on the motorway, the UE would reduce measurements inappropriately. Therefore, the home region in this case may be defined as being within range of a user's home wireless LAN, which is a smaller area than the coverage of the home cell.

According to this example, reduced monitoring is a reduction in the frequency of measurements.

In line with this example, there can be storage of "persistent" home cells, that would still be stored after e.g. one or more weeks of business travel/Christmas or other holidays, etc. or if the person is occasionally but repeatedly staying in other locations than main home/main work place, e.g. alternative work place, week-end house, etc.—typically for users with higher mobility.

Such "persistent" home cells would be subject to different conditions for being erased. User inputs could (alternatively or additionally) be used in this context.

EXAMPLE 1b

This example may be used with example 1; either independent from or in combination with example 1a; for instance.

According to this example, reduced monitoring is initiated dependent upon the UE having been camped on a cell for a certain time. If this is the case, then reduced frequency of measurements are initiated.

Figure 4:
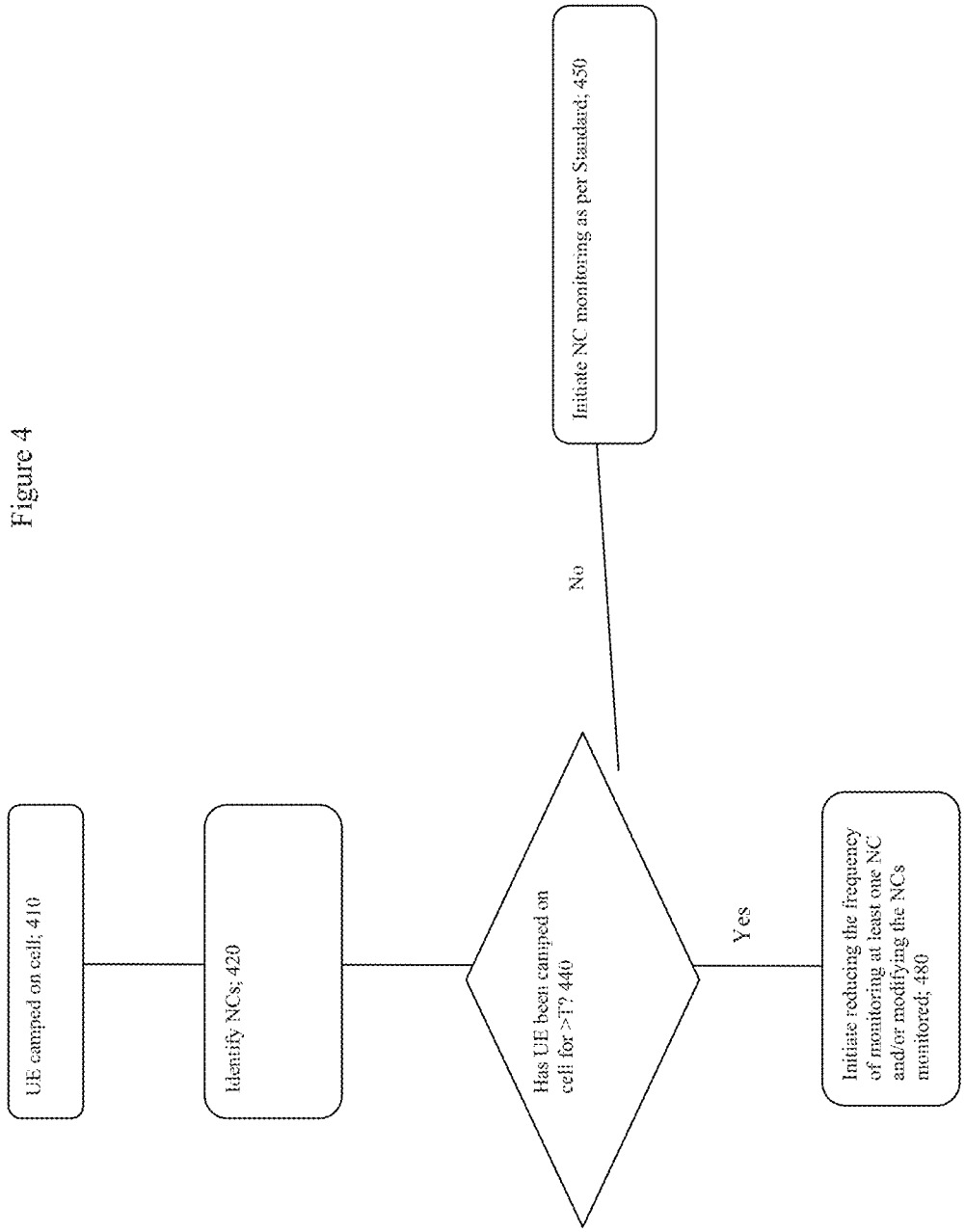
FIG. 4 is a flow diagram illustrating steps performed according to a further aspect of the approach described herein.

This example is illustrated in FIG. 4. In step 410, the UE is camped on a cell. The UE at step 420 then identifies neighbour cells for cell reselection measurements, which include a neighbour cell list indicating candidate cells/frequencies/RATs.

In step 440, there is a determination of whether the UE has been camped on a cell for more than a predetermined period of time. This is the time the UE has been currently camped on the cell, although in another example, it may be a cumulative time the UE has been camped on that cell previously when measured over another predetermined period of time. If there is a negative determination, then in 450 the UE initiates monitoring neighbouring cells (cell reselection measurements) as per the Standard.

If the UE has been camped on the cell for more than the predetermined period of time, then in 480 the UE initiates monitoring comprising monitoring a modified neighbour cell set (for example, a different or reduced set), or monitoring at least one of the neighbour cells at a reduced frequency. In the case where the cell is a home cell, then this example can be an illustration of example 1.

Comparing example 1b to example 1a, example 1a uses historical data, such that on entering a home cell/region, the UE knows immediately (based on the historical data) that it can reduce the measurements.

Example 1b uses the time that the UE has spent continuously in the same cell; this does not have to require historical information, and may take longer to establish the reduced measurements. That is, the mobility state of the UE in example 1b is based upon 'time spent in a cell', not on number of cell reselections and or cell selections in a given period.

EXAMPLE 1c

This example may be used together with example 1, or in combination with example 1 with one or more of example 1a and example 1b; for instance. In this "favourite route"' or "favourite neighbour cell" example, likely reselection candidate cell(s) for a particular serving cell have been previously identified and are used as the basis for the selection of cells to measure.

In this case, whether reduced monitoring is initiated depends upon satisfying the predetermined criterion that relates to previous cell changes. The considered cell changes preferably include cell reselections, and may also include network-initiated cell changes such as handovers, cell change orders, etc. such as may occur while in a connected mode like CELL_DCH. The reselection activity or mobility patterns history in question can include information of cells to which, starting from the cell the UE is currently camped on, the UE historically has most frequently reselected. This may be most frequent reselection within a previous predetermined period of time, or the most reselections within a set period of time, or the most reselections within a predetermined number of reselections. If almost all reselections from a considered cell are to a NC Y, say, the reduction in monitoring comprises reducing measurements of the NCs other than cell Y. In this way, the UE saves unnecessary power consumption in performing measurements of limited value.

This approach can be considered as a favourite neighbour cell approach, where cell Y is a favourite neighbour cell. In summary, if a UE consistently reselects a particular cell (cell Y) or cells as the favourite neighbour cell when camped in a given (optionally home) cell (cell X), then the UE can reduce measurements of cells other than Y (i.e. enter a reduced measurement mode). As such, a set of favourite neighbour cell(s)—that is, a set of cells to which reselection is most common when camped in a cell—can be determined and used according to this approach.

As for the home cell approach discussed above, in an alternative, the probability of wrongly selecting the favourite neighbour cell must be determined to be low, based on historical data. For example, e.g. in a particular building, the UE is served by cell A; if the user leaves the building by the main exits, the favourite neighbour cell will be either cell B (if leaving through the front entrance) or cell C (if leaving through the rear entrance). Cells D and E are also listed in the neighbour cell list of cell A but only provide good coverage to the sides of the building. Alternatively (as for a variant of the home cell approach discussed above) the favourite neighbour cell determination could be based on location information in addition to, or instead of, the identity of the serving cell; for example, it might incorporate coverage determination of specific WLAN access points, and/or GPS-derived information.

These routes (e.g. <"current location/serving cell", "favourite neighbour cell(s)"> pairs or combinations thereof) may be determined over time by a single UE, or crowd-sourced from multiple UEs, or by user or UE controlled start/stop register route.

Figure 5:
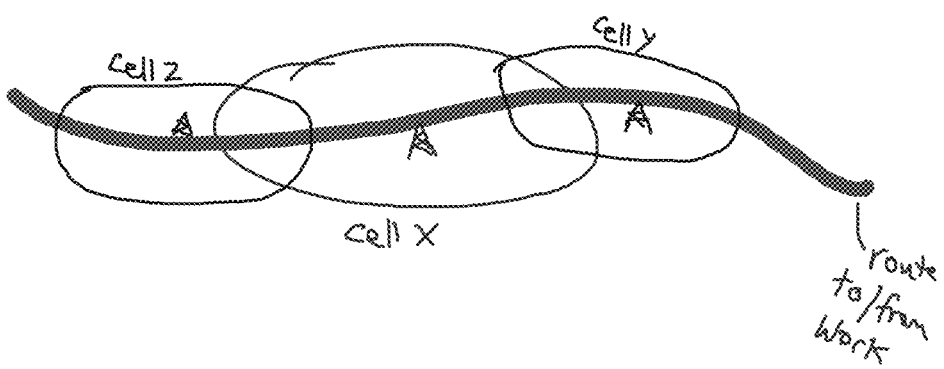
FIG. 5 is a diagram illustrating steps performed according to a further aspect of the approach described herein.

As with home cell detection, the favourite neighbour cell determination may also take into account network controlled mobility. Routes may be driven by maps application or similar data. There may be multiple favourite neighbour cells for a given serving cell, to account for e.g. cells encountered on a route to work, whereby in one direction, the favourite neighbour cell after cell X is cell Y, and in the other direction, the favourite neighbour cell is cell Z, as illustrated in FIG. 5.

Figure 6:
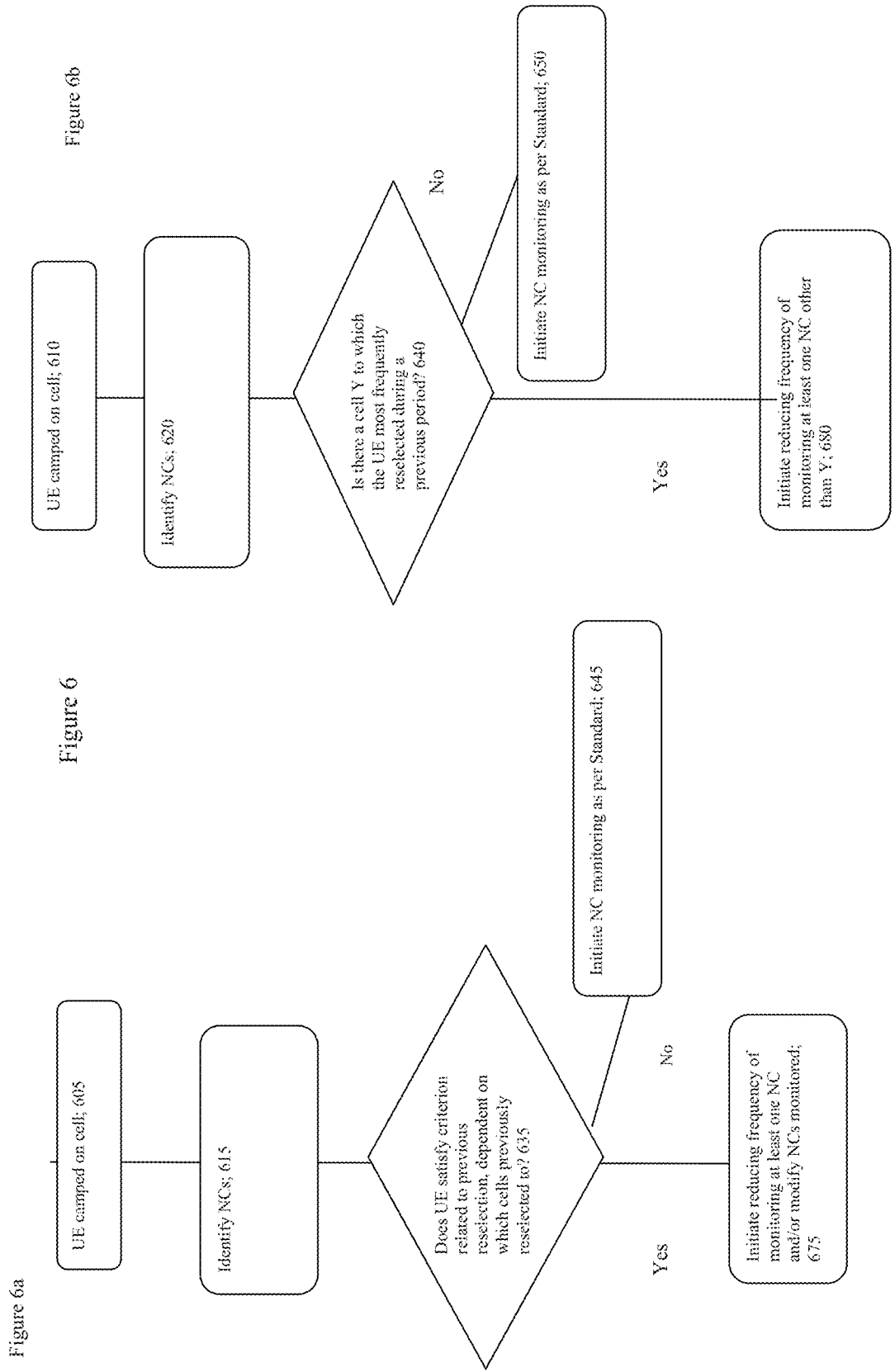
FIG. 6 is a diagram illustrating steps performed according to a further aspect of the approach described herein.

This example is further illustrated in FIGS. 6a and 6b. In FIG. 6a, the UE is camped on a cell, 605. Neighbour cells are identified in step 615; and in step 635 there is a determination of whether the UE satisfies a criterion related to previous reselection, dependent upon which cells have been previously reselected to.

If this is not the case, then in 645, neighbour cell monitoring is initiated as per the Standard. If it is the case, then reduced frequency of monitoring is begun of at least one neighbour cell and/or there is modification of the neighbour cells being monitored, 675.

In step 610, the UE is camped on a cell. The UE at step 620 then identifies neighbour cells for reselection measurements, which includes identifying a neighbour cell list indicating candidate cells/frequencies/RATs.

In step 640, there is a determination of whether there is a cell Y to which the UE reselected to a sufficient proportion of times (most frequently reselected to) within a previous predetermined period T. If such a cell Y is not identified, then in 650, the UE initiates monitoring neighbouring cells (cell reselection measurements) as per the Standard.

If there is a cell Y to which the UE reselected to for a sufficient proportion of the time within a previous predetermined period T, then in 680 the UE initiates reduced monitoring of neighbour cells by reducing the frequency of monitoring of at least one neighbour cell other than cell Y.

In this example, the UE may also take into account historical information regarding how long it took for reselection to occur in deciding on a favourite neighbour cell, e.g. starting from when a candidate cell is first detected, or from when the serving cell signal quality/strength drops below a certain threshold.

In relation to this example, generating a favourite neighbour cells list may require that a minimum number of reselections from the serving cell have previously been carried out. Generating the favourite neighbour cells list may require that a minimum amount of time (as a function of the number of reselections from the serving cell) has been previously spent in the serving cell. Generating the favourite neighbour cells list may require that the list contains cells corresponding to a minimum proportion of previous reselections from that cell, e.g. over a certain number of reselections.

Modification of the favourite neighbour cells list (or home cell list of example 1a) may be responsive to user input (including prompted user input, e.g. where the device prompts the user if they wish to add the current cell to a home cells list).

In the same way that minimum conditions may be specified for adding a cell to the list of home cells, conditions may be specified such that, when met, a cell is deleted from, its corresponding favourite neighbour cell list (and/or in example 1a, the list of home cells).

Example 1d

This example may be used together with example 1, or in combination with example 1 with one or more of example 1a, and/or 1b, and/or 1c; for instance.

A device may be configured (either remotely, or during initial configuration) or otherwise determined to be of a type where reduced measurements are permitted (such as a device configured for low access priority, which may be referred to as an MTC device—see 3GPP TS 22.368) to enable reduced measurement mode (either in combination with one or more of the above predetermined criteria, or in an alternative, independently).

Low access priority is a term in 3GPP TS 23.060 (e.g. v.10.4.0). It is may correspond to MTC (machine type communications)/MTM (machine-to-machine) communications and similar scenarios where higher data transmission delays and/or lower priority network access are tolerable. An entire UE could be configured for 'low access priority'; or UEs may be configured on an application-by-application basis within a single UE.

Figure 7:
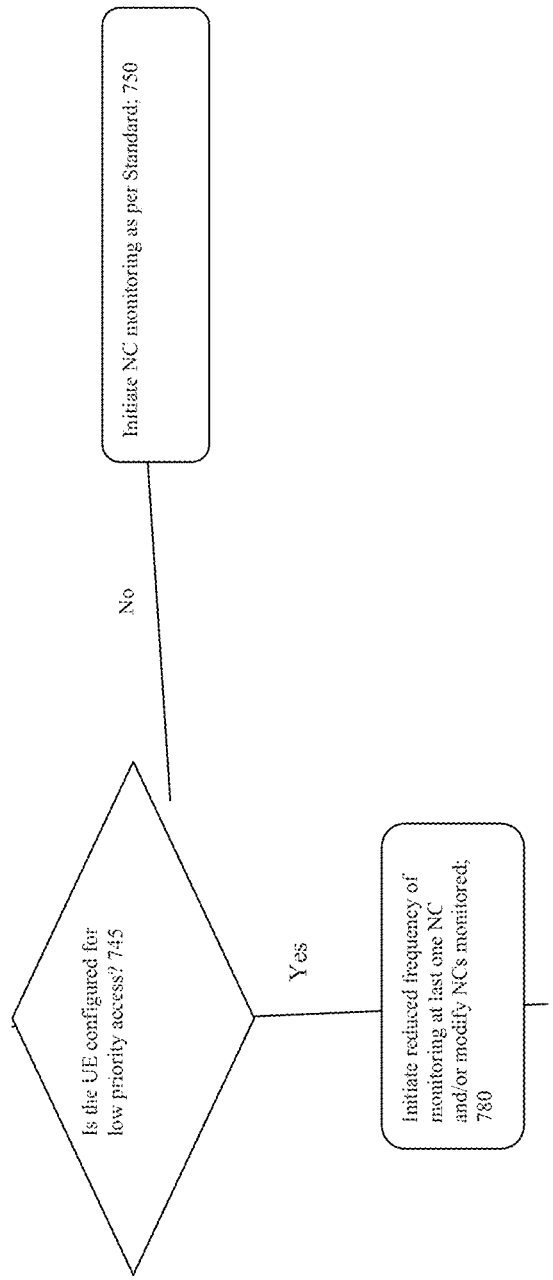
FIG. 7 is a diagram illustrating steps performed according to a further aspect of the approach described herein.

This is illustrated in FIG. 7. In step 745, there is a determination of whether the device is configured for low access priority. If it is not, then in 750, measurements are preformed for reselection as per the Standard.

If the device is configured for low access priority, then in 780, the device initiates monitoring a modified neighbour cell set (for example, reducing the number of cells monitored compared to what would otherwise be monitored) and/or reducing the frequency of monitoring at least one of the neighbour cells Configuration may be by means of Open Mobile Alliance (OMA) device management (DM) protocols, over-the-air (OTA) subscriber identity module (SIM) updates, or other appropriate subscription management solutions.

Selecting Favourite Neighbour Cells to Monitor

In the examples discussed above, when there is to be initiation of reduced monitoring, the UE can, in some aspects, use different algorithms to implement the reduced neighbouring cell (NC) measurements. As an example, the UE can short-list the NCs to be measured considering their probability of reselection from the serving cell. For instance if the probability of reselection of C2 from C1 (where C1 is the primary serving cell) is high relative to other 39 NCs, then the UE can prefer to reduce the measurement frequency on other 39 NCs; but keep C2 cell measurement as configured by the network.

Preferably, the UE in reduced monitoring operation should monitor a number of cells (and corresponding frequencies) sufficient to ensure that the correct reselection is expected to be performed in, say, 95% of cases (based on historical data). Preferably a minimum number of previous reselections from the serving cell (optionally, restricted to occasions where non-reduced measurements were being carried out) should have previously occurred and/or data should have been collected over a minimum duration, in order to ensure a reasonable reliability of the data. Such a threshold (combined with historical data) may be used to determine the number of cells to monitor.

Figure 8:
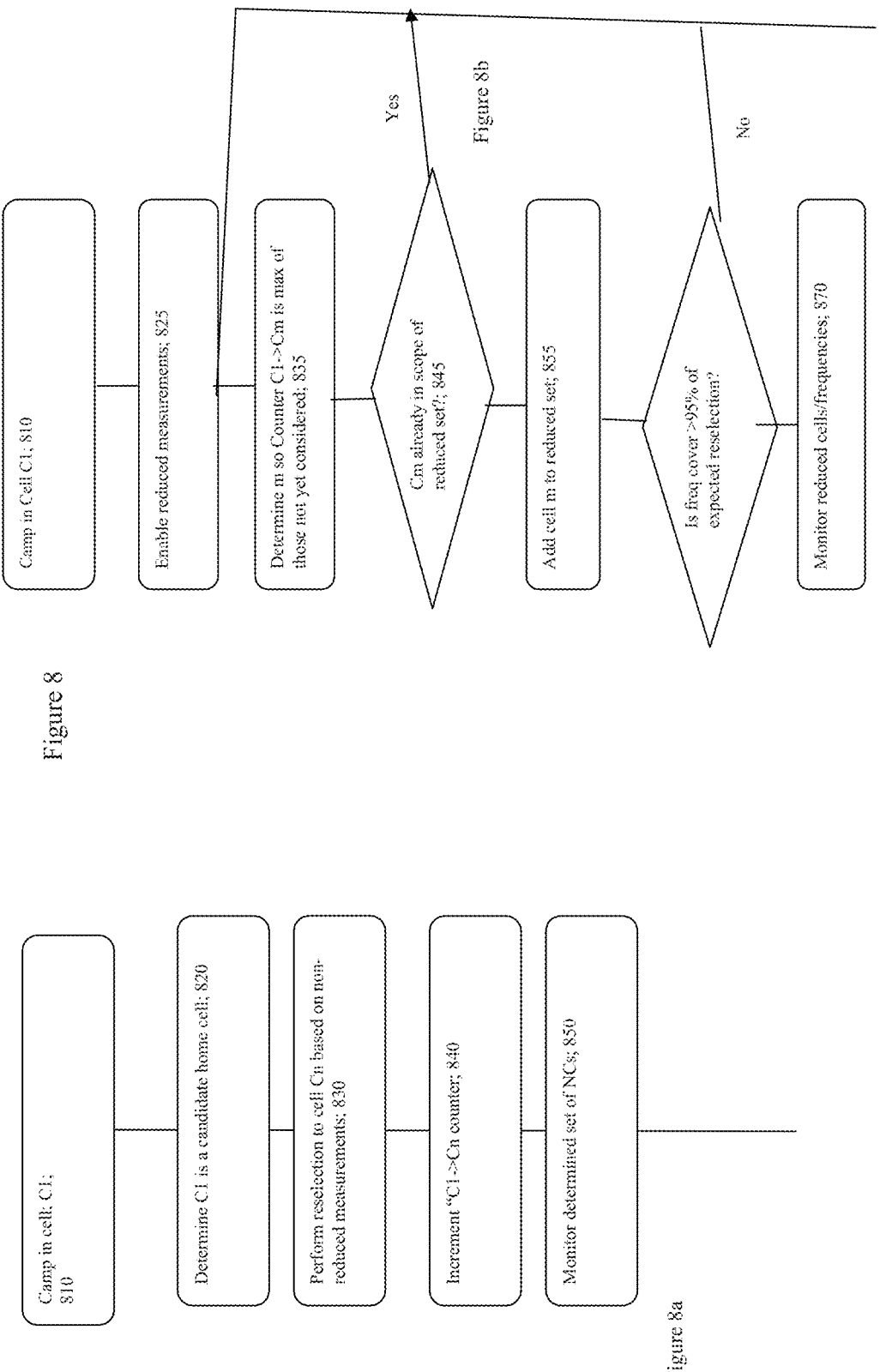
FIGS. 8a and 8b of FIG. 8 are flow diagrams illustrating steps performed according to a further aspect of the approach described herein.

FIGS. 8a and 8b illustrate an approach to reduce non essential NC measurements. In step 810, the UE is camped on cell C1 and in 820 the UE determines C1 is a home cell. In 830 the UE performs reselection to a cell Cn based upon non-reduced measurements, and in 840 a counter is incremented to record the number of reselections from C1 to Cn.

In FIG. 8b, the device is again camped on home cell C1 in 810. Reduced measurements are in this case enabled in 825. Determination to reduce measurements may be according to one or more of the criteria described above, or as in the favourite neighbour cell approach, may be dependent on a number of previous reselections from cell C1 to a particular candidate cell exceeding a threshold. It may further be dependent on the number of previous reselections from cell C1 to a particular candidate cell exceeding a threshold within a predetermined total duration of camping on cell C1—in other words, the device must have performed more than N_threshold reselections from C1 to a particular candidate cell having been camped in C1, in total (i.e. counting multiple non-contiguous periods of camping on C1), for more than T_threshold seconds.

In 835, there is a determination of Cm such that the counter of reselections from C1 to Cm is the maximum of those cells not yet considered. In 845, it is determined if Cm is already in the "scope" of the reduced set being used (i.e. can be measured with little or no additional processing when measuring the thus-far determined reduced set). This may be, for example, the case if Cm operates using the same RAT and, for UTRAN or E-UTRAN, on the same frequency as a previously selected cell. If it is the case, then the method goes back to step 835.

If Cm is not already in the scope of the reduced set, then the method proceeds in step 855 to add cell Cm (and its corresponding frequency) to the reduced set. 865 is a check that, as indicated above, the candidate cells and cells which can be measured with little or no additional processing when measuring the thus-far determined set of candidate cells cover more than 95% of recorded reselections. If not, then the method proceeds to step 835.

If more than 95% of the total number of recorded reselections is covered by the candidate cells and their "scope" (see above), then in 870 there is monitoring of reduced cells/frequencies.

An alternative (but equivalent) algorithm is, when adding a cell to the reduced set of cells in step 855, to also add cells which can be measured with little or no additional processing when measuring the thus-far determined reduced set.

Behaviour During Reduced Monitoring—"Reduced Measurements Mode"

The reduction of measurements may be by one or more of:
reducing the frequency of (i.e. increasing the interval between) measurements of cells on one or more inter-frequency frequencies;
reducing the frequency (possibly to zero in one aspect) of intra-frequency measurements;
reducing the frequency (possibly to zero in one aspect) of measurements of one or more sets of inter-RAT cells.

For all the examples above where "reduction of frequency of measurements" is referred to, this may or may not apply across the whole range of neighbour cells; for example, it may only apply to inter-RAT measurements; or, it may apply in phases to inter-RAT measurements, then to inter-Frequency measurements, etc. In general, the reduced set of measured cells in example 1c where specific cells are identified as favourite neighbour cells is different to the other examples of reduced frequency of measurements where the reduction is not applied on an individual cell basis.

Also, there may be multiple levels of reduction (as more/more stringent criteria are progressively met, further reduction in NC monitoring is permitted).

In one alternative, the UE measures at least one NC at least when the home cell falls below a predetermined threshold, such as an Ssearch threshold, otherwise no cell reselection will take place when the UE moves out of the home cell using one of the normal exit routes.

The determination of which cells/frequencies to monitor when in this mode may be based on a history of reselections from the serving cell.

During the 'reduced measurements' operation the UE in one alternative monitors the set of favourite neighbour cells to ensure that i) they are still operating as expected, and/or ii) that the mobile has not moved location. The frequency of the reduced NC set measurement might depend on if the NCs belong to intraFrequency, interFrequency and interRAT NC types.

In a further alternative, if a new cell is deployed on a frequency that is being monitored, this may be seen as a decrease in Ec/No on one or more of the favourite neighbour cells. So this may be a trigger to re-measure NCs (possibly just on one frequency) and re-evaluate the cell configuration. If a new cell is found, a possible implementation is to add it as a possible favourite neighbour cell or alternatively, the mobile could cease the reduced measurement behaviour until UE history is built up taking into account the new cell.

The set of reduced cells for monitoring in one example is used until the point that significant variance (with respect to previous observations) is detected in the measurements of the measured neighbouring cells, e.g. cells not found, very low signal strength/quality etc., or the user triggers a voluntary reset, or a condition set by the network becomes true e.g. if during reduced measurements mode it is discovered that a favourite neighbour cell (i.e. one those that it does continue to measure) of the one it is camped on, or a cell in the registered favourite route, disappears, then the mode should be exited. This could also trigger the registration of alternative favourite locations/routes that would be used in the same way.

An alternative or additional aspect is that, the UE can invoke reduced measurements if, or only if, the network indicates reduced measurements are allowed. Then if a NC is switched off, or the NC configuration changes in any way, the network can disallow reduced NC measurement for a period. The UE would see a change in system information, and use full NC measurements. Some time after the network configuration change, the system information could be changed back to indicate reduced measurements are allowed. If a UE acquired the cell just as the configuration was changing, then reduced measurements would be disabled at this time.

Another detailed example for measurement frequency tuning can be given as follows: If cell C1 has been identified as the cell on which the UE is most often camped, the UE can build a representation of a graph of RSCP and Ec/No measurements of this considered cell over time and note when reselections happen, or the serving cell fails the cell selection (S) criteria. The UE can identify a "signature" for this information/trace that indicates C1 will no longer be both the serving cell and above the cell selection criteria. This signature trace may be where RSCP is below Threshold1 for three DRX cycles or EcNo is below Threshold2 for three DRX cycles. So until one of those conditions is met, the UE is very likely to remain camped on C1 as a suitable cell. Therefore the UE can use any of these conditions to switch from reduced/infrequent NC measurements to normal NC measurements. The entry condition for reduced/infrequent NC measurement mode could simply be when camped on C1, or perhaps after being camped on C1 for T seconds, and not having left reduced NC measurements state in the previous T2 seconds.

Alternatively, other, possibly more elaborate algorithms are envisaged for UE behaviour, or for optimized UE behaviour.

UE-Network Signaling

UE-network signalling may be used in conjunction with the examples above:
  so that permission to use this technique may be signalled by the network;
  for the network to indicate explicitly to the UE that cell reconfiguration is occurring/has occurred/may occur (e.g. if one of the neighbour cells is powered down at night, or if the serving cell is about to be powered down); note that this may be implicit by indication of a change of SIB content in a MIB, but it may not necessarily be the case that SIB content would otherwise be (or even should be) modified in such a case—for example, if a neighbour cell list is given in terms of carrier frequencies (i.e. is not an explicit list of cells) then powering down one cell may not cause any change in the correct frequency list.

Leaving Reduced Measurement Mode

There are several alternatives for defining when the UE ceases the 'reduced measurements' operation, including:
  the home cell signal strength and/or quality deteriorates (e.g. it fails the S criteria for Nserv consecutive DRX cycles);
  home cell RSCP or Ec/No falls below thresholds not seen often historically;
  Leaving the home cell or the home region;
  DRX mode of operation is ceased or when the UE leaves CELL_FACH state (e.g. state transition to CELL_DCH);
  new user-plane traffic is (or is about to be) transferred [to ensure that the device is in the most appropriate cell];
    this may include responding to paging requests—the UE may delay the response to a paging request until it has determined that no cell reselection is needed;
  in response to an indication that cell reconfiguration has occurred;
  in response to user input (including prompted user input, e.g. where the device prompts the user for confirming the exit the reduced measurements mode).

In some cases, the UE may delay initiation of uplink (mobile-originated) data until it has performed sufficient neighbour cell measurements to determine whether it is on the most appropriate cell. In other cases (emergency calls, mobile-terminated voice calls), this may not be appropriate. In either case, after determining to leave the reduced monitoring operation, the UE may initiate "aggressive" neighbour cell monitoring such that cell reselection (or handover) can be quickly triggered if appropriate (such "aggressive monitoring" may exceed the existing requirements for neighbour cell monitoring).

An example of an algorithm that could be used to determine switching out of 'reduced measurements' mode is as follows.

Cell C1 has been identified as a cell the UE is frequently camped on for long time periods; when in reduced/infrequent NC measurement mode, if RSCP is below Threshold1 (some pre-determined, possibly implementation-specific, value) for three DRX cycles or Ec/No is below Threshold2 for three DRX cycles, the UE switches from reduced/infrequent NC measurements to normal NC measurements.

A device implementing the examples described above may reselect to a new cell more slowly, or not at all so that for example, a time offset may be added to the existing maximum permitted time for reselection as specified by the Standard. Such an offset may be equal to the existing measurement period. It may reselect to a different cell than the best one (and in particular, may reselect to a cell on a different frequency than the best cell—"best cell" is defined as the one which would be reselected according to the applicable algorithm/prioritization if up-to-date measurements were available for all cells/frequencies in the neighbour cell list.

The device may perform reselection only in certain conditions e.g. it may trigger reselection only when the serving cell strength/quality falls below a certain threshold, and may not trigger reselection to a higher priority cell if the serving cell strength/quality remains above a threshold (may be the same or different threshold).

The 'camped on any cell' state and 'limited service state' are, broadly, examples of cases where the serving cell is no longer suitable. Responsive to a determination that the serving cell is no longer suitable (which may result in the UE entering one of these states), the mobile may, in some examples, delete the corresponding stored list (i.e. it subsequently behaves as if the list had been deleted).

Responsive to the determination, the UE may leave the reduced monitoring mode.

The 3GPP TS 45.008 Standard, version 10.1.0 (2011 May) describes measurements of cells of other radio access technologies in sections 6.6.4 ff. According to the example described here, there is defined a reselection mode (mode 1) to allow for reduced neighbour cell measurements. In this example, it applies if no recent data transmission/reception and no recent cell change have occurred, and no future cell change is expected.

There is further a check for reselection after RLA_C in serving cell drops. In the description below, it is not always necessary that the Mobile Station (MS) picks the best UTRAN cell—a suitable cell is sufficient.

Below are example changes to the Standards in relation to some aspects of the examples described above. In the below, numbers in square brackets indicate numbers that are preferable, but not essential, and alternatives are possible.

The reference reflects that fact that these requirements may be only modified for 3G/LTE frequencies that are not being monitored. Measuring an extra cell on the same frequency is relatively low-cost.

These changes reflect the case where example 1c is independent to example 1a.

6.6.4a Reduced Monitoring of Neighbour Cells for Cell Reselection

In certain circumstances, the mobile station may reduce its monitoring of neighbour cells when in idle mode. In such cases, the mobile station may temporarily enter one or both RMNC (Reduced Monitoring of Neighbour Cells) modes.

The mobile station may enter RMNC mode if RLA_C of the serving cell exceeds THRESH_priority_search, if signalled; otherwise RLA_C of the serving cell exceeds [−78 dBm] and one or more of the following conditions are met:

- In the past [72] hours, the mobile station has been camped on the serving cell for more than [12] hours in total, and the mobile station has been camped on the current serving cell continuously for more than [5] minutes; in this case the mobile station enters RMNC mode 1.
- In the past [72] hours, the mobile station has performed cell reselection from the current serving cell more than [20] times when not in RMNC mode 2 and spent on average at least 10 minutes camped on the serving cell prior per reselection; in this case the mobile station enters RMNC mode 2.
- The mobile station has been camped in the serving cell continuously for more than [30] minutes; in this case the mobile station enters RMNC mode 1.
- The mobile station is configured for low access priority (see 3GPP TS 23.060); in this case the mobile station enters RMNC mode 1.

The mobile station may operate in RMNC mode 1 and RMNC mode 2 concurrently.

In RMNC mode 1, the mobile station may increase the time between measurements for all neighbour cell measurements and corresponding reselection calculations by a factor of [2]. As a consequence, the maximum timing values specified in sub-clause 6.6.1, 6.6.2 and 6.6.4 for the requirements to perform reselection are correspondingly increased (with the exception of T_reselection).

NOTE: For example, the first requirement to reselect to a UTRAN cell specified in sub-clause 6.6.4. is modified to "A UTRAN capable MS shall be able to identify and select a new best UTRAN cell on a frequency, which is part of the 3G Cell Reselection list, within [60] seconds (in case of cell reselection based on cell ranking) or [[50]+T_reselection] seconds (in case of cell reselection based on priority information, if the UTRAN frequency has lower priority than the serving cell and if RLA_C of the serving cell is below THRESH_priority_search) after it has been activated.

In RMNC mode 2, the mobile station may cease measurements of all neighbour cells except those to which it has performed reselection from the serving cell the most frequently in the last 72 hours, such that in total, the monitored cells account for at least [90%] of the previous reselections. When in RMNC mode 2, cell reselection requirements do not apply except in respect of cells which are being monitored or 3G or E-UTRAN cells which operate on the same frequency as a monitored cell.

In respect of both RMNC modes 1 and 2, the mobile station shall immediately leave RMNC modes 1 and 2 if any of the following occur:

- the mobile station enters 'out of service' state or 'camped on any cell' state or 'limited service state' (see 3GPP TS 43.022); in this case, the mobile station is prohibited from entering either RMNC mode 1 or mode 2 in the current serving cell for a further [72] hours;
- RLA_C of the serving cell falls below THRESH_priority_search, if signalled; or RLA_C of the serving cell falls below [−78 dBm];
- C1 of the serving cell remains below zero for more than 5 seconds;
- the mobile station performs cell selection.

In the following example change, example 1c is dependent on example 1a:

6.6.4a Reduced Monitoring of Neighbour Cells for Cell Reselection

In certain circumstances, the mobile station may reduce its monitoring of neighbour cells when in idle mode. In such cases, the mobile station may temporarily enter one or both RMNC (Reduced Monitoring of Neighbour Cells) modes.

A mobile station supporting RMNC mode 1 may store a RMNC Home Cells list according to the following requirements:

- If, in the past [72] hours, the mobile station has been camped on the serving cell for more than [12] hours in total, the serving cell shall be added to the RMNC Home Cells list of the mobile station.
- If the mobile station has not been camped on a cell of the RMNC Home Cells list for more than [12] hours in total over any continuous period of [72] hours within the last [8] weeks, the cell shall be removed from to the RMNC Home Cells list of the mobile station.
- The serving cell may be added to the RMNC Home Cells list of the mobile station upon user request.
- Any cell may be removed from the RMNC Home Cells list upon user request.

In addition, a mobile station supporting RMNC mode 1 and RMNC mode 2 may store a Favourite Neighbour Cells for any cell belonging to the RMNC Home Cells list according to the following requirements:

- The Favourite Neighbour Cells list shall contain the neighbour cells to which the mobile station has performed reselections from the corresponding cell of the RMNC Home Cells list such that in total, these neighbour cells account for at least [90%] of the last [20] reselections,
- Cells may be added to or removed from a Favourite Neighbour Cells list upon user request.
- If the mobile station camping on a cell of RMNC Home Cells list enters 'out of service' state or 'camped on any cell' state or 'limited service state' (see 3GPP TS 43.022), the corresponding Favourite Neighbour Cells list shall be emptied.

The mobile station may enter RMNC mode if RLA_C of the serving cell exceeds THRESH_priority_search, if signalled; otherwise RLA_C of the serving cell exceeds [−78 dBm] and one or more of the following conditions are met:

- The mobile station has been camped on a cell belonging to the RMNC Home Cells list continuously for more than [5] minutes; in this case the mobile station enters RMNC mode 1.
- The mobile station has been camped in the serving cell continuously for more than [30] minutes; in this case the mobile station enters RMNC mode 1.
- The mobile station is configured for low access priority (see 3GPP TS 23.060); in this case the mobile station enters RMNC mode 1.
- The mobile station has been camped on a cell belonging to the RMNC Home Cells set continuously for more than [5] minutes and there exists a non-empty Favourite Neighbour Cells list associated to this serving cell; in this case the mobile station enters RMNC mode 2.

The mobile station may operate in RMNC mode 1 and RMNC mode 2 concurrently.

In RMNC mode 1, the mobile station may increase the time between measurements for all neighbour cell measurements and corresponding reselection calculations by a factor of [2].

As a consequence, the maximum timing values specified in sub-clause 6.6.1, 6.6.2 and 6.6.4 for the requirements to perform reselection are correspondingly increased (with the exception of T_reselection).

NOTE: For example, the first requirement to reselect to a UTRAN cell specified in sub-clause 6.6.4. is modified to "A UTRAN capable MS shall be able to identify and select a new best UTRAN cell on a frequency, which is part of the 3G Cell Reselection list, within [60] seconds (in case of cell reselection based on cell ranking) or [[50]+T_reselection] seconds (in case of cell reselection based on priority information, if the UTRAN frequency has lower priority than the serving cell and if RLA_C of the serving cell is below THRESH_priority_search) after it has been activated . . . ."

In RMNC mode 2, the mobile station may cease measurements of all neighbour cells except those in the relevant Favourite Neighbour Cells list. When in RMNC mode 2, cell reselection requirements do not apply except in respect of cells which are being monitored or 3G or E-UTRAN cells which operate on the same frequency as a monitored cell.

In respect of both RMNC modes 1 and 2, the mobile station shall immediately leave RMNC modes 1 and 2 if any of the following occur:

the mobile station enters 'out of service' state or 'camped on any cell' state or 'limited service state' (see 3GPP TS 43.022);

RLA_C of the serving cell falls below THRESH_priority_search, if signalled; or RLA_C of the serving cell falls below [−78 dBm];

C1 of the serving cell remains below zero for more than 5 seconds;

the mobile station performs cell selection.

Correspondingly, the 3GPP TS 25.304 Standard v 10.2.0 describes a cell reselection evaluation process, with proposed changes to modify one of the existing sets of rules included below (similar changes, not shown, can be made to modify other rules):

5.2.6 Cell Reselection Evaluation Process
5.2.6.1 UTRA Case

The cell reselection process is specified in the following sub-clauses:

5.2.6.1.0 Use of MBMS PL

In the cell reselection process, an MBMS PL shall only be applicable while the UE is receiving an MBMS session from one or more of the ongoing activated MBMS services for which this PL is indicated.

5.2.6.1.1 Measurement Rules for Cell Re-Selection when HCS is not Used

The measurement rules below apply in Idle, URA_PCH, CELL_PCH states. For FDD, 3.84 Mcps TDD and 7.68 Mcps TDD, in CELL_FACH state the measurement rules below apply only if HS-DSCH discontinuous reception is configured, as specified in [4] and according to the requirements specified in [10]. Otherwise, the UE is required to perform measurements on all intra-frequency, inter-frequency and inter-RAT cells listed in system information according to requirements specified in [10]. For 1.28 Mcps TDD, in CELL_FACH state the UE is required to perform measurements on all intra-frequency, inter-frequency and inter-RAT cells listed in system information according to requirements specified in [11]. In Idle, URA_PCH, CELL_PCH and CELL_FACH states the UE shall only consider those cells the UE is mandated to measure according to the measurement rules below as measured cells in the cell reselection criteria (subclause 5.2.6.1.4).

If the system information broadcast in the serving cell indicates that HCS is not used, then for intra-frequency and inter-frequency measurements and inter-RAT measurements, the UE shall:

use Squal for FDD cells and Srxlev for TDD for Sx, and apply the following rules.

1. If $Sx>S_{intrasearch}$, UE may choose to not perform intra-frequency measurements.

If $Sx<=S_{intrasearch}$, perform intra-frequency measurements.

If $S_{intrasearch}$, is not sent for serving cell, perform intra-frequency measurements.

If $Sx>S_{intrasearch}$ and, in the past [72] hours, the mobile station has performed cell reselection from the current serving cell more than [20] times and spent on average at least 10 minutes camped on the serving cell prior per such reselection, the mobile station may choose not to perform measurements of neighbour cells to which it has performed reselection from the serving cell the least frequently (or never) in the last 72 hours, provided that in total, the monitored cells account for at least [90%] of the previous reselections. In this case, cell reselection requirements do not apply except in respect of cells which are being monitored or 3G or E-UTRAN cells which operate on the same frequency as a monitored cell.

If the system information broadcast in the serving cell indicates that HCS is not used and absolute priorities for inter-frequency layers are not provided, then for inter-frequency measurements the UE shall:

2. If $Sx>S_{intersearch}$ and MBMS PL has not been indicated, and $Srxlev>S_{searchHCS}$ if $S_{searchHCS}$ is signalled, UE may choose to not perform inter-frequency measurements.

If $Sx>S_{intersearch}$ and MBMS PL has been indicated and the serving cell belongs to the MBMS PL, and $Srxlev>S_{searchHCS}$ if $S_{searchHCS}$ is signalled, UE may choose to not perform inter-frequency measurements.

If $Sx>S_{intersearch}$, and MBMS PL has been indicated and the serving cell does not belong to the MBMS PL, and $Srxlev>S_{searchHCS}$ if $S_{searchHCS}$ is signalled, UE shall at least perform inter-frequency measurements on the MBMS PL.

If $Sx<=S_{intersearch}$, or $Srxlev<=S_{searchHCS}$ if $S_{searchHCS}$ is signalled, perform inter-frequency measurements.

If $S_{intersearch}$, is not sent for serving cell, perform inter-frequency measurements.

If Dedicated CSG frequencies have been indicated by system information the UE may choose not to perform inter-frequency measurements of these frequencies.

If the system information broadcast in the serving cell indicates that HCS is not used and absolute priorities for some inter-RAT layers are not provided, then for inter-RAT measurements on RATs for which absolute priority information is not provided the UE shall:

3. If $Sx>Ssearch_{RAT\ m}$, and $Srxlev>S_{HCS,RATm}$ if $S_{HCS,RATm}$ is signalled, UE may choose to not perform measurements on cells of RAT "m".

If $Sx<=Ssearch_{RAT\ m}$, or $Srxlev<=S_{HCS,RATm}$ if $S_{HCS,RATm}$ is signalled, perform measurements on cells of RAT "m".

If $Ssearch_{RAT\ m}$, is not sent for serving cell, perform measurements on cells of RAT "m".

If HCS is not used and if $S_{limit,SearchRATm}$ is sent for serving cell, UE shall ignore it. concurrently.

NOTE: The presence of $S_{searchHCS}$ and $S_{HCS,RATm}$ thresholds in system information are used to avoid introducing new parameters to system information and their presence does not imply that HCS is used.

5.2.6.1.1a High-Mobility State when HCS is not Used

High-mobility state, as applied in HCS case, is also applicable in non-HCS if the parameters non-HCS_$T_{CRmax}$, non-HCS_$N_{CR}$ and non-HCS_$T_{CRmaxhyst}$ are sent on the system information broadcast.

If in non-HCS environment the number of cell reselections during time period non-HCS_$T_{CRmax}$ exceeds non-HCS_$N_{CR}$, or if the network (via RRC signalling) has ordered the UE to consider itself to be in high-mobility state, then high-mobility state has been detected.

When the number of cell reselections during time period non-HCS_$T_{CRmax}$ no longer exceeds non-HCS_$N_{CR}$, the UE shall:
  continue in high-mobility state.
  if the criteria for entering high-mobility state is not detected during time period non-HCS-$T_{CmaxHyst}$:
    exit high-mobility state.

If the UE is in non-HCS environment and in high-mobility state, the UE shall apply the speed dependent scaling rules as defined in subclause 5.2.6.1.4.

5.2.6.1.2 Measurement Rules for Cell Re-Selection when HCS is Used

The measurement rules below apply in Idle, URA_PCH, CELL_PCH states. For FDD, 3.84 Mcps TDD and 7.68 Mcps TDD, in CELL_FACH state the measurement rules below apply only if HS-DSCH discontinuous reception is configured, as specified in [4] and according to the requirements specified in [10]. Otherwise, the UE is required to perform measurements on all intra-frequency, inter-frequency and inter-RAT cells listed in system information according to requirements specified in [10]. For 1.28 Mcps TDD, in CELL_FACH state the UE is required to perform measurements on all intra-frequency, inter-frequency and inter-RAT cells listed in system information according to requirements specified in [11]. In Idle, URA_PCH, CELL_PCH and CELL_FACH states the UE shall only consider those cells the UE is mandated to measure according to the measurement rules below as measured cells in the cell reselection criteria (subclause 5.2.6.1.4).

HCS shall not be used for inter-frequency and inter-RAT-reselection if absolute priority based cell reselection is used (see subclause 5.2.6.1.4a).

Use Squal for FDD cells and Srxlev for TDD cells for Sx and apply the following rules.

If the system information broadcast in the serving cell indicates that HCS is used, then for intra-frequency and inter-frequency measurements, the UE shall:
use HCS priority$_1$ as the HCS priority broadcast in the system information and apply the following rule:
  IF an MBMS PL is used THEN
    If the UE is not in high-mobility state, for serving cell and neighbour cells belonging to the MBMS PL set the HCS priority=HCS priority$_1$+HCS_OFF$_{mbms}$.
    If the UE is in high-mobility state, for serving cell and neighbour cells belonging to the MBMS PL set the HCS priority=HCS priority$_1$.
  for serving cell and neighbour cells not belonging to the MBMS PL, set the HCS priority=HCS priority$_1$
  IF an MBMS PL is not used THEN
  For serving cell and all neighbour cells set HCS priority=HCS priority$_1$
  Then apply this to the following:
  1. For intra-frequency and inter-frequency measurement rules for UEs not in high-mobility state IF (Srxlev$_s$ <= Ssearch$_{HCS}$) or (if FDD and S$_x$ <= S$_{intersearch}$) THEN
measure on all intra-frequency and inter-frequency cells.
ELSE
IF (S$_x$ > S$_{intrasearch}$) THEN
    measure on all intra-frequency and inter-frequency cells, which have higher HCS priority level than the serving cell
    ELSE
    measure on all intra-frequency and inter-frequency cells, which have equal or higher HCS priority level than the serving cell
    ENDIF
  IF (S$_{intrasearch}$ is not sent for the serving cell) THEN
    measure on all intra-frequency cells. UEs in high-mobility state may also use this rule.
    measure on all inter-frequency cells, which have higher HCS priority level than the serving cell unless measurement rules for UEs in high-mobility state are triggered.
  ENDIF
ENDIF
If HCS is used and if S$_{searchHCS}$ or S$_{intersearch}$ (in FDD) are not sent for the serving cell, UE shall:
measure on all intra-frequency and inter-frequency cells.

2. For intra-frequency and inter-frequency measurement rules for UE's in high-mobility state:

If the number of cell reselections during time period $T_{CRmax}$ exceeds $N_{CR}$, or if the network (via RRC signalling) has ordered the UE to consider itself in high-mobility state, then high-mobility state has been detected. In this high-mobility state, the UE shall
    IF (Srxlev$_s$ <= Ssearch$_{HCS}$) or (if FDD and S$_x$ <= S$_{intersearch}$),
or S$_{searchHCS}$ or S$_{intersearch}$ (in FDD) are not sent for the serving cell THEN
    measure on all intra-frequency and inter-frequency cells.
  ELSE
    measure intra-frequency and inter-frequency neighbouring cells, which have equal or lower HCS priority than serving cell.
  ENDIF
  When the number of cell reselections during time period $T_{CRmax}$ no longer exceeds $N_{CR}$, UE shall
- continue these measurements during time period $T_{CrmaxHyst}$
- if the criteria for entering high-mobility state is not detected during time period
    $T_{CrmaxHyst}$:
    -   exit high-mobility state.

If Dedicated CSG frequencies have been indicated by System Information the UE may choose not to perform inter-frequency measurements of these frequencies. When serving cell belongs to a hierarchical cell structure, the UE shall follow these rules for Inter-RAT measurements:
  1. Inter-RAT threshold-based measurement rules for UEs not in high-mobility state IF (Srxlev$_s$ <= S$_{HCS,RATm}$) or (if FDD and S$_x$ <= S$_{searchRATm}$) THEN
UE shall measure on all inter-RATm cells.
ELSE
IF (S$_x$ > S$_{limit,SearchRATm}$) THEN
    UE may choose to not measure neighbouring cells in RAT "m".
    ELSE
    UE shall measure on all neighbouring cells in RAT "m", which have equal or higher HCS priority level than the serving cell
    ENDIF
ENDIF
If HCS is used and if S$_{HCS,RATm}$ is not sent for the serving cell, UE shall measure on all inter-RATm cells.

2. Inter-RAT measurement rules for UEs in high-mobility state

- If the number of cell reselections during time period $T_{CRmax}$ exceeds $N_{CR}$, or if the network (via RRC signalling) has ordered the UE to consider itself in high- mobility state, then high-mobility state has been -continued

```
  detected. In this high-mobility state, the UE shall
- IF (Srxlev_s <= S_HCS,RATm) or (if FDD and S_x <= S_SearchRATm), or
  S_HCS,RATm or S_searchRATm are not sent for the serving cell THEN
  -    UE shall measure on all inter-RATm cells.
  ELSE
  -    measure the neighbouring cells in RAT "m", which have an equal
       or lower HCS priority than the serving cell
- ENDIF
  When the number of cell reselections during time interval T_CRmax no
  longer exceeds N_CR, UE shall
  -    continue these measurements during time period T_CrmaxHyst
  -    if the criteria for entering high-mobility state is not detected
       during time period T_CrmaxHyst
  -    exit high-mobility state.
```

5.2.6.1.2a Measurement Rules for Inter-Frequency and Inter-RAT Cell Reselection when Absolute Priorities are Used The measurement rules below apply in Idle, URA_PCH, CELL_PCH states. In CELL_FACH state the UE is required to perform measurements of inter-frequency and inter-RAT cells listed in system information according to requirements specified in [10]. UE specific priorities are not applied in camped on any cell state.

If the UE has received absolute priority information for inter-frequency layers, the UE shall follow these rules:

The UE shall perform measurements of inter-frequency layers with a priority higher than the priority of the current serving layer.

NOTE: The rate of these measurements may vary depending on whether Srxlev and Squal of the serving cell are above or below $S_{prioritysearch1}$ and $S_{prioritysearch2}$. This is specified in [10].

When the UE in camped normally state, has only dedicated priorities other than for the current frequency, the UE shall consider the current frequency to be the lowest priority frequency (i.e. lower than the eight network configured values).

For inter-frequency layers with a priority equal or lower than the priority of the current serving layer:

If $Srxlev_{ServingCell} > S_{prioritysearch1}$ and $Squal_{ServingCell} > S_{prioritysearch2}$ the UE may choose not to perform measurements of inter-frequency layers of equal or lower priority.

If $Srxlev_{ServingCell} <= S_{prioritysearch1}$ or $Squal_{ServingCell} <= S_{prioritysearch2}$ the UE shall perform measurements of inter-frequency layers of equal or lower priority.

The UE shall not perform measurements of inter-frequency layers for which the UE has no absolute priority.

If the UE has received absolute priority information for inter-RAT layers, the UE shall follow these rules:

The UE shall perform measurements of inter-RAT layers with a priority higher than the priority of the current serving cell.

NOTE: The rate of these measurements may vary depending on whether Srxlev and Squal of the serving cell are above or below $S_{prioritysearch1}$ and $S_{prioritysearch2}$. This is specified in [10].

For inter-RAT layers with a priority lower than the priority of the current serving cell:

If $Srxlev_{ServingCell} > S_{prioritysearch1}$ and $Squal_{ServingCell} > S_{prioritysearch2}$ the UE may choose not to perform measurements of inter-RAT layers of lower priority.

If $Srxlev_{ServingCell} <= S_{prioritysearch1}$ or $Squal_{ServingCell} <= S_{prioritysearch2}$ the UE shall perform measurements of inter-RAT layers of lower priority.

The UE shall perform measurements according to sub-clause 5.2.6.1.1 for inter-RAT layers for which the UE has no absolute priority. For all inter-RAT layers belonging to one RAT, either the rules above or the rules in subclause 5.2.6.1.1 or 5.2.6.1.2 shall apply.

The 3GPP TS 25.133 Standard v 10.4.0 section 4.2 relates to Cell Re-selection. The extract below indicates proposed changes in relation to some aspects of the example(s) above, where underlining indicates proposed changes to the text to modify the rules specified in the italic text to reflect the invention:

4.2 Cell Re-Selection 4.2.1 Introduction

The cell reselection procedure allows the UE to select a more suitable cell and camp on it.

When the UE is in either Camped Normally state or Camped on Any Cell state on a FDD cell, the UE shall attempt to detect, synchronise, and monitor intra-frequency, inter-frequency and inter-RAT cells indicated in the measurement control system information of the serving cell. UE measurement activity is also controlled by measurement rules defined in TS25.304, allowing the UE to limit its measurement activity if certain conditions are fulfilled.

4.2.2 Requirements

In the following sections, $T_{higher\_priority\_search}$ is defined as $(60*N_{layers})$ seconds, where $N_{layers}$ is the total number of configured higher priority E-UTRA, UTRA FDD and UTRA TDD carrier frequencies and is additionally increased by one if one or more groups of GSM frequencies is configured as a higher priority.

4.2.2.1 Measurement and Evaluation of Cell Selection Criteria S of Serving Cell

The UE shall measure the CPICH Ec/Io and CPICH RSCP level of the serving cell and evaluate the cell selection criterion S defined in [1] for the serving cell at least every DRX cycle. The UE shall filter the CPICH Ec/Io and CPICH RSCP measurements of the serving cell using at least 2 measurements. Within the set of measurements used for the filtering, at least two measurements shall be spaced by, at least $T_{measureFDD}/2$ (see table 4.1).

If the UE has evaluated in $N_{serv}$ consecutive DRX cycles that the serving cell does not fulfill the cell selection criterion S, the UE shall initiate the measurements of all neighbour cells indicated in the measurement control system information, regardless of the measurement rules currently limiting UE measurement activities.

If the UE has not found any new suitable cell based on searches and measurements of the neighbour cells indicated in the measurement control system information for 12 s, the UE shall initiate cell selection procedures for the selected PLMN as defined in [1].

After this 12 s period a UE in Cell:PCH or URA_PCH is considered to be "out of service area" and shall perform actions according to 25.331.

On transition from CELL_DCH to CELL_PCH/URA_PCH, if a UE cannot find a suitable UTRA cell, then it is considered to be "out of service area" and shall perform actions according to [16].

If the S criterion of the serving cell is no longer fulfilled, the UE may suspend MBMS reception if necessary to improve the UE's ability to find a suitable cell. If the S criterion of the serving cell is fulfilled, the measurement requirements when a MBMS reception is active are specified in sections 4.2.2.2 and 4.2.2.9.

4.2.2.2 Measurements of Intra-Frequency Cells

The UE shall measure CPICH Ec/Io and CPICH RSCP at least every $T_{measureFDD}$ (see table 4.1) for intra-frequency cells that are identified and measured according to the measurement rules. $T_{measureFDD}$ is defined in Table 4.1. The UE shall filter CPICH Ec/Io and CPICH RSCP measurements of each measured intra-frequency cell using at least 2 measurements. Within the set of measurements used for the filtering, at least two measurements shall be spaced by at least $T_{measureFDD}/2$.

The filtering shall be such that the UE shall be capable of evaluating that an intra-frequency cell has become better ranked than the serving cell within $T_{evaluateFDD}$ (see table 4.1), from the moment the intra-frequency cell became at least 3 dB better ranked than the current serving cell, provided that Treselection timer is set to zero and either CPICH Ec/Io or CPICH RSCP is used as measurement quantity for cell reselection.

If Treselection timer has a non zero value and the intra-frequency cell is better ranked than the serving cell, the UE shall evaluate this intra-frequency cell for the Treselection time. If this cell remains better ranked within this duration, then the UE shall reselect that cell.

If the UE is receiving the MTCH, the UE shall to be able to identify new intra-frequency cells and take them into use for MTCH combining purposes as defined in section 8.4.2.2.1

4.2.2.3 Measurements of Inter-Frequency FDD Cells

If priority information for UTRA FDD carrier frequencies is provided in the measurement control systems information and $Srxlev_{ServingCell} > S_{prioritysearch1}$ and $Squal_{ServingCell} > S_{prioritysearch2}$ then the UE shall search for any higher priority UTRA inter-frequency cells at least every $T_{higher\_priority\_search}$ where $T_{higher\_priority\_search}$ is described in section 4.2.2. If the UE is not in CELL_PCH, URA_PCH or IDLE state then the UE shall search for UTRA FDD layers of higher priority within $T_{higher\_layer\_start}$ upon entering into any of these states. If 1 second has not elapsed since the UE camped on the current serving cell when the UE enters into any of these states, $T_{higher\_layer\_start}$ is one DRX cycle plus 1 second; otherwise $T_{higher\_layer\_start}$ is one DRX cycle. If higher priority UTRA cells are found by the higher priority search, they shall be measured at least every $(N_{carrier}-1)*T_{measureFDD}$. If, after detecting a cell in a higher priority search, it is determined that reselection has not occurred then the UE is not required to continuously measure the detected cell to evaluate the ongoing possibility of reselection. However, the minimum measurement filtering requirements specified later in this section shall still be met by the UE before it makes any determination that it may stop measuring the cell. If priority information for UTRA FDD carrier frequencies is provided in the measurement control systems information and $Srxlev_{ServingCell} <= S_{prioritysearch1}$ or $Squal_{ServingCell} <= S_{prioritysearch2}$, the rules defined below apply irrespective of the priority of the inter-frequency layer.

The UE shall measure CPICH Ec/Io and CPICH RSCP at least every $(N_{carrier}-1)*T_{measureFDD}$ (see table 4.1) for inter-frequency cells that are identified and measured according to the measurement rules. The parameter $N_{carrier}$ is the number of carriers used for FDD cells. The UE shall filter CPICH Ec/Io and CPICH RSCP measurements of each measured inter-frequency cell using at least 2 measurements. Within the set of measurements used for the filtering, at least two measurements shall be spaced by at least $T_{measureFDD}/2$.

If CPICH Ec/Io is used as measurement quantity for cell reselection, the filtering shall be such that the UE shall be capable of evaluating that an already identified inter-frequency cell has met the reselection criteria in [1] within $(N_{carrier}-1)*T_{evaluateFDD}$ (see table 4.1) from the moment the inter-frequency cell met the reselection criteria by at least 3 dB provided that Treselection timer is set to zero. For non-identified inter-frequency cells, the filtering shall be such that the UE shall be capable of evaluating that inter-frequency cell has met the reselection criteria in [1] within 30 s from the moment the inter-frequency cell met the reselection criteria by at least 3 dB provided that Treselection timer is set to zero.

If CPICH RSCP is used as measurement quantity for cell reselection, the filtering shall be such that the UE shall be capable of evaluating that an already identified inter-frequency cell has met the reselection criteria in [1] within $(N_{carrier}-1)*T_{evaluateFDD}$ from the moment the inter-frequency cell met the reselection criteria by at least 5 dB dB for reselection based on ranking, or [6] dB for reselection based on absolute priorities provided that Treselection timer is set to zero. For non-identified inter-frequency cells, the filtering shall be such that the UE shall be capable of evaluating that inter-frequency cell hasmet the reselection criteria in [1] within 30 s from the moment the inter-frequency cell met the reselection criteria by at least 5 dB dB for reselection based on ranking, or [6] dB for reselection based on absolute priorities provided that Treselection timer is set to zero.

If Treselection timer has a non zero value and the inter-frequency cell meets the reselection criteria in [1], the UE shall evaluate this inter-frequency cell for the Treselection time. If this cell fulfils the reselection criteria within this duration, then the UE shall reselect that cell. concurrently.

4.2.2.4 Measurements of Inter-Frequency TDD Cells

The requirements in this section shall apply to UE supporting FDD and TDD.

The UE shall measure P-CCPCH RSCP at least every $N_{carrierTDD}*T_{measureTDD}$ (see table 4.1) for inter-frequency TDD cells that are identified and measured according to the measurement rules. The parameter $N_{carrierTDD}$ is the number of carriers used for inter-frequency TDD cells. The UE shall filter P-CCPCH RSCP measurements of each measured inter-frequency TDD cell using at least 2 measurements. Within the set of measurements used for the filtering, at least two measurements shall be spaced by at least $T_{measureTDD}/2$.

The filtering of PCCPCH RSCP shall be such that the UE shall be capable of evaluating that an already identified inter-frequency TDD cell has become better ranked than the serving cell within $N_{carrierTDD}*T_{evaluateTDD}$ from the moment the inter-frequency TDD cell became at least 5 dB better ranked than the current serving cell provided that Treselection timer is set to zero. For non-identified inter-frequency TDD cells, the filtering shall be such that the UE shall be capable of evaluating that an inter-frequency TDD cell has become better ranked than the serving cell within 30 s from the moment the inter-frequency TDD cell became at least 5 dB better ranked than the current serving cell provided that Treselection timer is set to zero.

If Treselection timer has a non zero value and the inter-frequency TDD cell is better ranked than the serving cell, the UE shall evaluate this inter-frequency TDD cell for the Treselection time. If this cell remains better ranked within this duration, then the UE shall reselect that cell.

4.2.2.5 Measurements of Inter-RAT GSM Cells
4.2.2.5.1 Cell Reselection Based on Cell Ranking The requirements in this subclause shall apply if the UE uses the cell ranking algorithm for inter-RAT cell reselection [1].

The UE shall measure the signal level of the GSM BCCH carrier of each GSM neighbour cell indicated in the measurement control system information of the serving cell, according to the measurement rules defined in [1], at least every $T_{measureGSM}$ (see table 4.1). The UE shall maintain a running average of 4 measurements for each GSM BCCH carrier. The measurement samples for each cell shall be as far as possible uniformly distributed over the averaging period.

If GSM measurements are required by the measurement rules in [1], the UE shall attempt to verify the BSIC at least every 30 seconds for each of the 4 strongest GSM BCCH carriers and rank the verified GSM BCCH cells according to the cell reselection criteria defined in [1]. If a change of BSIC is detected for one GSM cell then that GSM BCCH carrier shall be treated as a new GSM neighbour cell.

If the UE detects a BSIC, which is not indicated in the measurement control system information, the UE shall not consider that GSM BCCH carrier in cell reselection. The UE also shall not consider the GSM BCCH carrier in cell reselection, if the UE cannot demodulate the BSIC of that GSM BCCH carrier.

If Treselection timer has a non zero value and the inter-RAT GSM cell is better ranked than the serving cell, the UE shall evaluate this inter-RAT GSM cell for the Treselection time. If this cell remains better ranked within this duration, then the UE shall reselect that cell.

4.2.2.5.2 Cell Reselection Based on Priority Information

The requirements in this subclause shall apply if the UE uses the absolute priorities based algorithm for inter-RAT cell reselection [1].

If $Srxlev_{ServingCell} > S_{prioritysearch1}$ and $Squal_{ServingCell} > S_{prioritysearch2}$ then the UE shall search for and measure GSM cells if the priority of GSM is higher than the serving cell. The minimum rate at which the UE is required to search for and measure such layers may be reduced in this scenario to maintain UE battery life.

When the measurement rules defined in [1] indicate that inter-RAT cells are to be measured then the UE shall measure, the signal level of the GSM BCCH carriers if the GSM BCCH carriers are indicated in the measurement control system information of the serving cell. GSM BCCH carriers of lower priority than the serving cell shall be measured at least every $T_{measure,GSM}$ (see table 4.1).

If $Srxlev_{ServingCell} > S_{prioritysearch1}$ and $Squal_{ServingCell} > S_{prioritysearch2}$ then the UE shall search for GSM BCCH carrier at least every $T_{higher\_priority\_search}$ where $T_{higher\_priority\_search}$ is described in section 4.2.2. If the UE is not in CELL_PCH, URA_PCH or IDLE state then the UE shall search for GSM layers of higher priority within $T_{higher\_layer\_start}$ upon entering into any of these states. If 1 second has not elapsed since the UE camped on the current serving cell when the UE enters into any of these states, $T_{higher\_layer\_start}$ is one DRX cycle plus 1 second; otherwise $T_{higher\_layer\_start}$ is one DRX cycle. When higher priority GSM BCCH carriers are found by the higher priority search, they shall be measured at least every $T_{measure,GSM}$, and the UE shall decode the BSIC of the GSM BCCH carrier. If, after detecting a cell in a higher priority search, it is determined that reselection has not occurred then the UE is not required to continuously measure the detected cell to evaluate the ongoing possibility of reselection to continuously verify the BSIC of the GSM BCCH carrier every 30 s. However, the minimum measurement filtering requirements specified later in this section shall still be met by the UE before it makes any determination that it may stop measuring the cell. If $Srxlev_{ServingCell} <= S_{prioritysearch1}$ or $Squal_{ServingCell} <= S_{prioritysearch2}$, the rules defined below apply irrespective of the priority of the GSM layer.

The UE shall maintain a running average of 4 measurements for each GSM BCCH carrier. The measurement samples for each cell shall be as far as possible uniformly distributed over the averaging period.

If continuous GSM measurements are required by the measurement rules in [1], the UE shall attempt to verify the BSIC at least every 30 seconds for each of the 4 strongest GSM BCCH carriers. If a change of BSIC is detected for one GSM cell then that GSM BCCH carrier shall be treated as a new GSM neighbour cell. If the UE detects on a BCCH carrier a BSIC which is indicated as not allowed for that carrier in the measurement control system information of the serving cell, the UE is not required to perform BSIC re-confirmation for that cell.

The UE shall not consider the GSM BCCH carrier in cell reselection, if the UE cannot demodulate the BSIC of that GSM BCCH carrier. Additionally, the UE shall not consider a GSM neighbour cell in cell reselection, if it is indicated as not allowed in the measurement control system information of the serving cell.

4.2.2.5a Measurements of Inter-RAT E-UTRA Cells

The UE shall be able to identify new E-UTRA cells and perform RSRP measurements of identified E-UTRA cells if carrier frequency information is provided by the serving cell, even if no explicit neighbour list with physical layer cell identities is provided.

If $Srxlev_{ServingCell} > S_{prioritysearch1}$ and $Squal_{ServingCell} > S_{prioritysearch2}$ then the UE shall search for E-UTRA layers of higher priority at least every $T_{higher\_priority\_search}$ where $T_{higher\_priority\_search}$ is described in section 4.2.2. If the UE is not in CELL_PCH, URA_PCH or IDLE state then the UE shall search for E-UTRA layers of higher priority within $T_{higher\_layer\_start}$ upon ent entering into any of these states. If 1 second has not elapsed since the UE camped on the current serving cell when the UE enters into any of these states, $T_{higher\_layer\_start}$ is one DRX cycle plus 1 second; otherwise $T_{higher\_layer\_start}$ is one DRX cycle. The minimum rate at which the UE is required to search for and measure such layers may be reduced in this scenario to maintain UE battery life.

If $Srxlev_{ServingCell} <= S_{prioritysearch1}$ or $Squal_{ServingCell} <= S_{prioritysearch2}$ then the UE shall search for and measure E-UTRA frequency layers of higher or lower priority in preparation for possible reselection. In this scenario, the minimum rate at which the UE is required to search for and measure higher priority layers shall be the same as that defined below for a lower priority layers.

The UE shall be able to evaluate whether a new detectable lower priority inter-RAT E-UTRA cell meets the reselection criteria defined in [1] within $K_{carrier} * T_{detectE-UTRA}$, where $T_{detectE-UTRA}$ is given in Table 4.2, if E-UTRA carrier frequency information is provided in the inter-RAT measurement control system information when Treselection=0 provided that the reselection criteria is met by at least 6 dB. The parameter $K_{carrier}$ is the number of E-UTRA carrier frequencies indicated in the inter-RAT measurement control system information. An inter RAT E-UTRAN cell is considered to be detectable if:

RSRP$|_{dBm}$ according to Annex B.1.1 for a corresponding Band;

The UE shall measure RSRP at least every $K_{carrier} * T_{measure,EUTRA\_}$ as defined in table 4.2 for identified E-UTRA cells.

When higher priority cells are found by the higher priority search, they shall be measured at least every $T_{measureE-UTRA}$. If, after detecting a cell in a higher priority search, it is determined that reselection has not occurred then the UE is not required to continuously measure the detected cell to evaluate the ongoing possibility of reselection. However, the minimum measurement filtering requirements specified later in this section shall still be met by the UE before it makes any determination that it may stop measuring the cell. If the UE detects on a E-UTRA carrier a cell whose physical identity is indicated as not allowed for that carrier in the measurement control system information of the serving cell, the UE is not required to perform measurements on that cell.

If the UE detects on a E-UTRA carrier a cell whose physical identity is indicated as not allowed for that carrier in the measurement control system information of the serving cell, the UE is not required to perform measurements on that cell.

The UE shall filter RSRP measurements of each measured E-UTRA cell using at least 2 measurements. Within the set of measurements used for the filtering, at least two measurements shall be spaced by at least $(K_{carrier}*T_{measure,EUTRA})/2$.

RSRP measurements of E-UTRA cells shall not be filtered over a longer period than that specified in Table 4.2.

The UE shall not consider an E-UTRA neighbour cell in cell reselection, if it is indicated as not allowed in the measurement control system information of the serving cell.

For an inter-RAT E-UTRA cell that has been already detected, but that has not been reselected to, the filtering shall be such that the UE shall be capable of evaluating that the E-UTRA cell has met reselection criterion defined TS 36.304 within $K_{carrier}\ T_{evaluateEUTRA}$ as specified in table 4.2 provided that the reselection criteria is met by at least 6 dB and the Treselection timer is set to zero.

4.2.2.5b Reduced Monitoring of Neighbour Cells for Cell Reselection

In certain circumstances, the UE may reduce its monitoring of neighbour cells when in idle mode, CELL_FACH, URA_PCH and CELL_PCH. In such cases, the mobile station may temporarily enter RMNC (Reduced Monitoring of Neighbour Cells) mode if $Sx>S_{intrasearch}$ (if $S_{intrasearch}$ is signalled) and one or more of the following conditions are met:

- In the past [72] hours, the UE has been camped on the serving cell for more than [12] hours in total, and the UE has been camped on the current serving cell continuously for more than [5] minutes;
- The UE has been camped in the serving cell continuously for more than [30] minutes;
- The UE is configured for low access priority (see 3GPP TS 23.060).

In RMNC mode, the maximum time between measurements for all neighbour cell measurements and corresponding reselection calculations is increased by a factor of [2]. As a consequence, the maximum timing values specified in sub-clauses 4.2.2.1 to 4.2.2.5a inclusive for the requirements to perform measurements are correspondingly increased.

NOTE: For example, in sub-clause 4.2.2.5a, it is stated "When higher priority cells are found by the higher priority search, they shall be measured at least every $T_{measureE-UTRA}$."; when the UE operates in RMNC mode, the corresponding requirement is that "When higher priority cells are found by the higher priority search, they shall be measured at least every ([2]× $T_{measureE-UTRA}$)".

In addition, in RMNC mode, the maximum time between searches for higher priority cells is increased by a factor of [1.5]; that is, when in RMNC mode, $T_{higher\_priority\_search}$ is defined as $([90]*N_{layers})$ seconds, where $N_{layers}$ is the total number of configured higher priority E-UTRA, UTRA FDD and UTRA TDD carrier frequencies and is additionally increased by one if one or more groups of GSM frequencies is configured as a higher priority.

In addition, in RMNC mode, $T_{higher\_layer\_start}$ does not apply. On entering CELL_PCH, URA_PCH or IDLE state the UE shall search for layers of higher priority within $T_{higher\_priority\_search}$ upon entering into any of these states, The UE shall immediately leave RMNC mode if the UE enters 'camped on any cell' state or 'limited service state' (see 3GPP TS 43.022); in this case, the UE is prohibited from entering RMNC mode in the current serving cell for a further [72] hours.

4.2.2.6 Evaluation of Cell Re-Selection Criteria

The UE shall evaluate the cell re-selection criteria defined in TS 25.304 for the cells, which have new measurement results available, at least every DRX cycle.

UE shall perform cell reselection immediately after the reselection criteria have been met (e.g. the UE has found a higher ranked suitable cell or the UE has found a suitable cell on a higher priority RAT), unless less than 1 second has elapsed from the moment the UE started camping on the serving cell. The ranking of the cells shall be made according to the cell reselection criteria specified in TS25.304.

A UE may initiate a search for neighbour cells (particularly higher priority cells) shortly (e.g. within a few seconds) after entering Idle mode (or other modes, such as CELL_PCH or URA_PCH). While remaining in idle mode, the UE searches relatively infrequently (e.g. with spacing of the order of minutes between successive searches). According to one aspect of the invention, however, a UE behaves differently with respect to the first search(es) which are carried out after entering Idle mode—if it has enabled reduced monitoring mode, for example, it may delay the initial search for a higher priority cell or frequency after entering Idle mode so that it is performed (for example, of the order of 10 s of seconds, or minutes) after entering Idle mode." [i.e./e.g. to meet the requirements for idle mode periodicity of searches, but ignoring, or substantially delaying the initial search after entering idle mode]. (The compliment is also envisaged, if reduced monitoring mode is not enabled then it performs an initial search shortly after entering Idle mode.)

The main benefit is that if the device is going in and out of idle mode more than once every few minutes, then (according to an aspect of the invention) it need not perform high priority cell searches every single time if one or more conditions described herein for the reduction of neighbour cell monitoring are met.

The 3GPP TS 36.133 Standard, v10.20 (2011 June) section 4.2.2.4 relates to measurements of inter-frequency E-UTRAN cells. The extract below indicates proposed changes in relation to some aspects of the example(s) above, shown by underlining for changes by addition:

4.2.2.4 Measurements of Inter-Frequency E-UTRAN Cells

The UE shall be able to identify new inter-frequency cells and perform RSRP or RSRQ measurements of identified inter-frequency cells if carrier frequency information is provided by the serving cell, even if no explicit neighbour list with physical layer cell identities is provided.

For an inter-frequency cell that has been already detected, but that has not been reselected to, the filtering shall be such that the UE shall be capable of evaluating that the inter-frequency cell has met reselection criterion defined in TS 36.304 within $K_{carrier}*T_{evaluate,E-UTRAN\_Inter}$ when $T_{reselection}=0$ as specified in table 4.2.2.4-1 provided that the reselection criteria is met by a margin of at least 5 dB for reselections based on ranking or 6 dB for RSRP reselections based on absolute priorities or 4 dB for RSRQ reselections based on absolute priorities. When evaluating cells for reselection, the side conditions for RSRP and SCH apply to both serving and inter-frequency cells.

If $T_{reselection}$ timer has a non zero value and the inter-frequency cell is better ranked than the serving cell, the UE shall evaluate this inter-frequency cell for the $T_{reselection}$ time. If this cell remains better ranked within this duration, then the UE shall reselect that cell.

When a UE works under the static reselection mode, under the same radio conditions and reselection criteria, an offset shall be added on the top of the corresponding requirement for detection and evaluation. The UE shall be able to evaluate whether a newly detectable inter-frequency cell meets the reselection criteria defined in TS36.304 within $K_{carrier}*T_{detect,EUTRAN\_Inter}+T_{static\_reselection\_offset}$. For an inter-frequency cell that has been already detected, but that has not been reselected to, the filtering shall be such that the UE shall be capable of evaluating that the inter-frequency cell has met reselection criterion defined in TS 36.304 within $K_{carrier}*T_{evaluate,E-UTRAN\_Inter}+T_{static\_reselection\_offset}$. The value of $T_{static\_reselection\_offset}$ is [the same as $T_{measure,EUTRAN\_Inter}$].

TABLE 4.2.2.4-1

$T_{detect,EUTRAN\_Inter}$, $T_{measure,EUTRAN\_Inter}$ and $T_{evaluate,E-UTRAN\_Inter}$

| DRX cycle length [s] | $T_{detect,EUTRAN\_Inter}$ [s] (number of DRX cycles) | $T_{measure,EUTRAN\_Inter}$ [s] (number of DRX cycles) | $T_{evaluate,E-UTRAN\_Inter}$ [s] (number of DRX cycles) |
|---|---|---|---|
| 0.32 | 11.52 (36) | 1.28 (4) | 5.12 (16) |
| 0.64 | 17.92 (28) | 1.28 (2) | 5.12 (8) |
| 1.28 | 32 (25) | 1.28 (1) | 6.4 (5) |
| 2.56 | 58.88 (23) | 2.56 (1) | 7.68 (3) |

4.2.2.5 Measurements of Inter-RAT Cells

If $Srxlev>S_{nonIntraSearchP}$ and $Squal>S_{nonIntraSearchQ}$ then the UE shall search for inter-RAT layers of higher priority at least every $T_{higher\_priority\_search}$ where $T_{higher\_priority\_search}$ is described in section 4.2.2

If $Srxlev \leq S_{nonIntraSearchP}$ or $Squal \leq S_{nonIntraSearchQ}$ then the UE shall search for and measure inter-RAT layers of higher, lower priority in preparation for possible reselection. In this scenario, the minimum rate at which the UE is required to search for and measure higher priority inter-RAT layers shall be the same as that defined below for lower priority RATs.

4.2.2.5.1 Measurements of UTRAN FDD Cells

When the measurement rules indicate that UTRA FDD cells are to be measured, the UE shall measure CPICH Ec/Io and CPICH RSCP of detected UTRA FDD cells in the neighbour frequency list at the minimum measurement rate specified in this section. The parameter $N_{UTRA\_carrier}$ is the number of carriers in the neighbour frequency list. The UE shall filter CPICH Ec/Io and CPICH RSCP measurements of each measured UTRA FDD cell using at least 2 measurements. Within the set of measurements used for the filtering, at least two measurements shall be spaced by at least half the minimum specified measurement period.

The UE shall evaluate whether newly detectable UTRA FDD cells have met the reselection criteria in TS 36.304 within time $(N_{UTRA\_carrier})*T_{detectUTRA\_FDD}$ when $Srxlev \leq S_{nonIntrasearchP}$ or $Squal \leq S_{nonIntraSearchQ}$ when $Treselection_{RAT}=0$ provided that the reselection criteria is met by a margin of at least 6 dB for reselections based on RSCP, or a margin of at least 3 dB for reselections based on Ec/Io.

Cells which have been detected shall be measured at least every $(N_{UTRA\_carrier})*T_{measureUTRA\_FDD}$ when $Srxlev \leq S_{nonIntraSearchP}$ or $Squal \leq S_{nonIntraSearchQ}$.

When higher priority UTRA FDD cells are found by higher priority search, they shall be measured at least every $T_{measure,UTRA\_FDD}$. If, after detecting a cell in a higher priority search, it is determined that reselection has not occurred then the UE is not required to continuously measure the detected cell to evaluate the ongoing possibility of reselection. However, the minimum measurement filtering requirements specified later in this section shall still be met by the UE before it makes any determination that it may stop measuring the cell.

For a cell that has been already detected, but that has not been reselected to, the filtering shall be such that the UE shall be capable of evaluating that an already identified UTRA FDD cell has met reselection criterion defined in 3GPP TS 36.304 [1] within $(N_{UTRA\_carrier})*T_{evaluateUTRA\_FDD}$ when $T_{reselection}=0$ as specified in table 4.2.2.5.1-1 provided that the reselection criteria is met by a margin of at least 6 dB for reselections based on RSCP, or a margin of at least 3 dB for reselections based on Ec/Io. When a UE works under the static reselection mode, the UE shall be capable of evaluating that an already identified UTRA FDD cell has met reselection criterion defined in 3GPP TS 36.304 [1] within $(N_{UTRA\_carrier})*T_{evaluateUTRA\_FDD}+T_{evaluateUTRA\_FDD\_offset}$ when $T_{reselection}=0$ as specified in table 4.2.2.5.1-1 whereas the margin when reselection criteria applies is the same as the normal reselection mode. The value of $T_{evaluateUTRA\_FDD\_offset}$ is [the same as $T_{measureUTRA\_FDA}$]

If $T_{reselection}$ timer has a non zero value and the UTRA FDD cell is satisfied with the reselection criteria which are defined in [1], the UE shall evaluate this UTRA FDD cell for the $T_{reselection}$ time. If this cell remains satisfied with the reselection criteria within this duration, then the UE shall reselect that cell.

TABLE 4.2.2.5.1-1

$T_{detectUTRA\_FDD}$, $T_{measureUTRA\_FDD}$, and $T_{evaluateUTRA\_FDD}$

| DRX cycle length [s] | $T_{detectUTRA\_FDD}$ [s] | $T_{measureUTRA\_FDD}$ [s] (number of DRX cycles) | $T_{evaluateUTRA\_FDD}$ [s] (number of DRX cycles) |
|---|---|---|---|
| 0.32 | 30 | 5.12 (16) | 15.36 (48) |
| 0.64 |  | 5.12 (8) | 15.36 (24) |
| 1.28 |  | 6.4 (5) | 19.2 (15) |
| 2.56 | 60 | 7.68 (3) | 23.04 (9) |

4.2.2.5.2 Measurements of UTRAN TDD Cells

When the measurement rules indicate that UTRA TDD cells are to be measured, the UE shall measure P-CCPCH RSCP of detected UTRA TDD cells in the neighbour frequency list at the minimum measurement rate specified in this section. The parameter $N_{UTRA\_carrier\_TDD}$ is the number of carriers used in the neighbour frequency list. The UE shall filter P-CCPCH RSCP measurements of each measured UTRA TDD cell using at least 2 measurements. Within the set of measurements used for the filtering, at least two measurements shall be spaced by at least half the minimum specified measurement period. P-CCPCH RSCP of UTRAN TDD cells shall not be filtered over a longer period than that specified in table 4.2.2.5.2-1.

The UE shall evaluate whether newly detectable UTRA TDD cells have met the reselection criteria in TS 36.304 within time $(N_{UTRA\_carrier\_TDD})*T_{detectUTRA\_TDD}$ when $Srxlev \leq S_{nonIntraSearchP}$ or $Squal \leq S_{nonIntraSearchQ}$ $T_{reselection}=0$ provided that the reselection criteria is met by a margin of at least 6 dB.

Cells which have been detected shall be measured at least every $(N_{UTRA\_carrier\_TDD})*T_{measureUTRA\_TDD}$ $Srxlev \leq S_{nonIntraSearchP}$ or $Squal \leq S_{nonIntraSearchQ}$.

When higher priority UTRA TDD cells are found by the higher priority search, they shall be measured at least every $T_{measure,UTRA\_TDD}$. If, after detecting a cell in a higher priority search, it is determined that reselection has not occurred then the UE is not required to continuously measure the detected cell to evaluate the ongoing possibility of reselection. However, the minimum measurement filtering requirements specified later in this section shall still be met by the UE before it makes any determination that it may stop measuring the cell.

For a cell that has been already detected, but that has not been reselected to, the filtering shall be such that the UE shall be capable of evaluating that an already identified UTRA TDD cell has met reselection criterion defined in [1] within $N_{UTRA\_carrier\_TDD}*T_{evaluateUTRA\_TDD}$ when $T_{reselection}=0$ as specified in table 4.2.2.5.2-1 provided that the reselection criteria is met by a margin of at least 6 dB. When a UE works under the static reselection mode, the UE shall be capable of evaluating that an already identified UTRA TDD cell has met reselection criterion defined in [1] within $(N_{UTRA\_carrier})*T_{evaluateUTRA\_FDD}+T_{evaluateUTRA\_TDD\_offset}$ when $T_{reselection}=0$ as specified in table 4.2.2.5.1-1 whereas the reselection criteria is met by a margin of at least 6 dB. The value of $T_{evaluateUTRA\_TDD\_offset}$ is [the same as $T_{measureUTRA\_TDD}$].

If $T_{reselection}$ timer has a non zero value and the UTRA TDD cell is satisfied with the reselection criteria which are defined in [1], the UE shall evaluate this UTRA TDD cell for the $T_{reselection}$ time. If this cell remains satisfied with the reselection criteria within this duration, then the UE shall reselect that cell.

TABLE 4.2.2.5.2-1

$T_{detectUTRA\_TDD}$, $T_{measureUTRA\_TDD}$ and $T_{evaluateUTRA\_TDD}$

| DRX cycle length [s] | $T_{detectUTRA\_TDD}$ [s] | $T_{measureUTRA\_TDD}$ [s] (number of DRX cycles) | $T_{evaluateUTRA\_TDD}$ [s] (number of DRX cycles) |
|---|---|---|---|
| 0.32 | 30 | 5.12 (16) | 15.36 (48) |
| 0.64 |    | 5.12 (8)  | 15.36 (24) |
| 1.28 |    | 6.4 (5)   | 19.2 (15)  |
| 2.56 | 60 | 7.68 (3)  | 23.04 (9)  |

4.2.2.5.4 Measurements of HRPD Cells

In order to perform measurement and cell reselection to HRPD cell, the UE shall acquire the timing of HRPD cells.

When the measurement rules indicate that HRPD cells are to be measured, the UE shall measure CDMA2000 HRPD Pilot Strength of HRPD cells in the neighbour cell list at the minimum measurement rate specified in this section.

The parameter 'Number of HRPD Neighbor Frequency', which is transmitted on E-UTRAN BCCH, is the number of carriers used for all HRPD cells in the neighbour cell list.

When the E-UTRA serving cell fulfils $Srxlev > S_{nonIntraSearchP}$ and $Squal > S_{nonIntraSearchQ}$, the UE shall search for CDMA2000 HRPD layers of higher priority at least every $T_{higher\_priority\_search}$ where $T_{higher\_priority\_search}$ is defined in section 4.2.2.

For CDMA2000 HRPD cells which have been detected, the UE shall measure CDMA2000 HRPD Pilot Strength at least every (Number of HRPD Neighbor Frequency)*$T_{measureHRPD}$, when the E-UTRA serving cell $Srxlev \leq S_{nonIntraSearchP}$ or $Squal \leq S_{nonIntraSearchQ}$.

The UE shall be capable of evaluating that the CDMA2000 HRPD cell has met cell reselection criterion defined in [1] within $T_{evaluateHRPD}$. When a UE works under the static reselection mode, the UE shall be capable of evaluating that the CDMA2000 HRPD cell has met cell reselection criterion defined in [1] within $T_{evaluateHRPD}+T_{evaluateHRPD\_offset}$ where the value of $T_{evaluateHRPD\_offset}$ is [the same as $T_{measureHRPD}$]

Table 4.2.2.5.4-1 gives values of $T_{measureHRPD}$ and $T_{evaluateHRPD}$.

TABLE 4.2.2.5.4-1

$T_{measureHRPD}$ and $T_{evaluateHRPD}$

| DRX cycle length [s] | $T_{measureHRPD}$ [s] (number of DRX cycles) | $T_{evaluateHRPD}$ [s] (number of DRX cycles) |
|---|---|---|
| 0.32 | 5.12 (16) | 15.36 (48) |
| 0.64 | 5.12 (8)  | 15.36 (24) |
| 1.28 | 6.4 (5)   | 19.2 (15)  |
| 2.56 | 7.68 (3)  | 23.04 (9)  |

If $T_{reselection}$ timer has a non zero value and the CDMA2000 HRPD cell is satisfied with the reselection criteria which are defined in [1], the UE shall evaluate this CDMA2000 HRPD cell for the $T_{reselection}$ time. If this cell remains satisfied with the reselection criteria within this duration, then the UE shall reselect that cell.

4.2.2.5.5 Measurements of cdma2000 1X

In order to perform measurement and cell reselection to cdma2000 1X cell, the UE shall acquire the timing of cdma2000 1X cells.

When the measurement rules indicate that cdma2000 1X cells are to be measured, the UE shall measure cdma2000 1x RTT Pilot Strength of cdma2000 1X cells in the neighbour cell list at the minimum measurement rate specified in this section.

The parameter 'Number of CDMA2000 1X Neighbor Frequency', which is transmitted on E-UTRAN BCCH, is the number of carriers used for all cdma2000 1X cells in the neighbour cell list.

When the E-UTRA serving cell fulfils $Srxlev > S_{nonInterSearchP}$ and $Squal > S_{nonIntraSearchQ}$, the UE shall search for cdma2000 1X layers of higher priority at least every $T_{higher\_priority\_search}$ where $T_{higher\_priority\_search}$ is defined in section 4.2.2.

For CDMA2000 1X cells which have been detected, the UE shall measure CDMA2000 1xRTT Pilot Strength at least every (Number of CDMA2000 1X Neighbor Frequency)*$T_{measureCDMA2000\_1X}$, when the E-UTRA serving cell $Srxlev \leq S_{nonIntraSearchP}$ or $Squal \leq S_{nonIntraSearchQ}$. The UE shall be capable of evaluating that the cdma2000 1X cell has met cell reselection criterion defined in [1] within $T_{evaluateCDMA2000\_1X}$. When a UE works under the static reselection mode, the UE shall be capable of evaluating that the CDMA2000 1X cell has met cell reselection criterion defined in [1] within $T_{evaluateCDMA2000\_1X}+ T_{evaluateCDMA2000\_1X\_offset}$ where the value of $T_{evaluateCDMA2000\_1X\_offset}$ is [the same as $T_{measureCDMA2000\_1X}$.]

Figure 9:
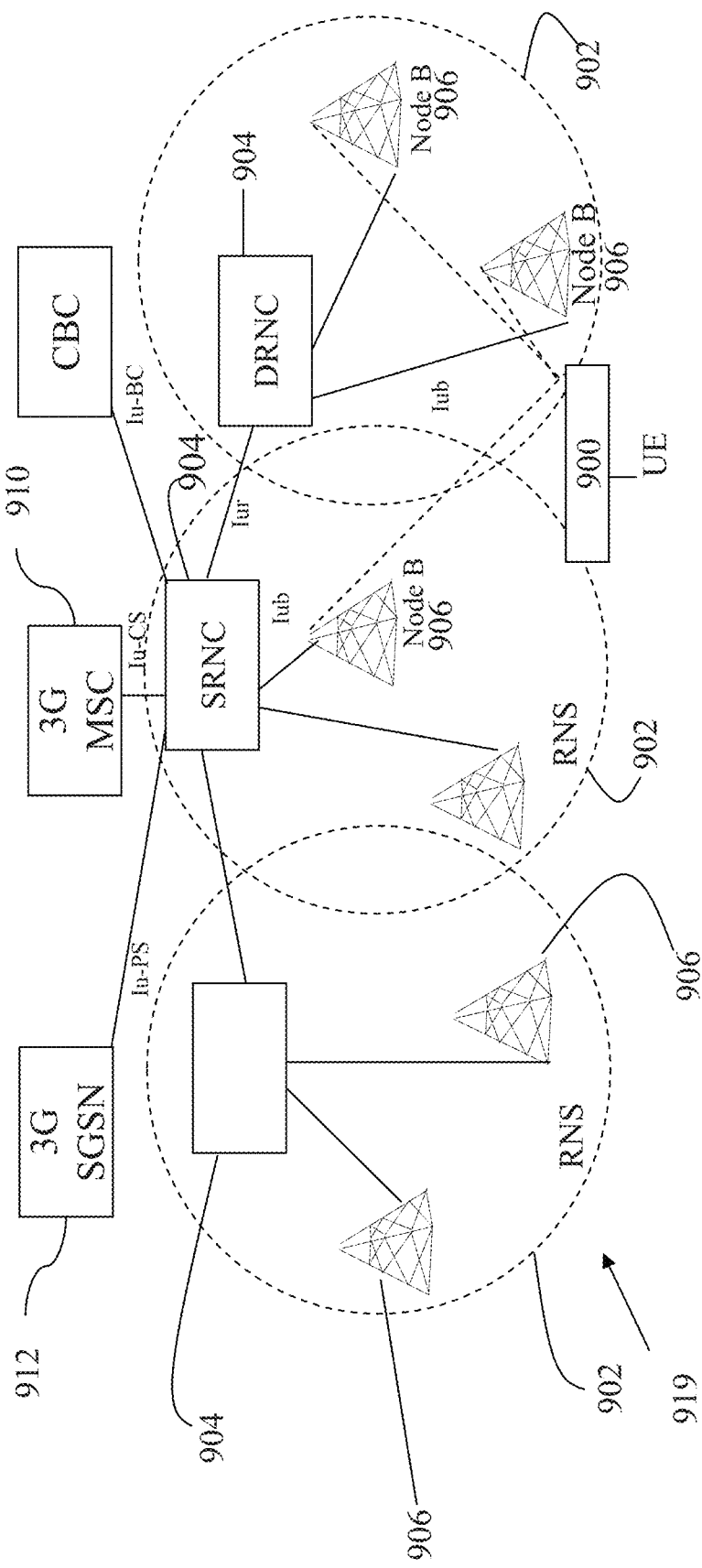
FIG. 9 shows an overview of a network and a UE device.

FIG. 9 shows an overview of a network and a UE device. Clearly in practice there may be many UE devices operating with the network but, for the sake of simplicity, FIG. 9 only shows a single UE device 900. For the purposes of illustration, FIG. 9 also shows a network 919 having a few components. It will be clear to a person skilled in the art that in practice a network will include far more components than those shown.

FIG. 9 shows an overview of the radio access network 919 (UTRAN) used in a UMTS system. The network 919 as shown in FIG. 9 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 900 may be mobile within the radio access network. Radio connections (indicated by the straight dotted lines in FIG. 9) are established between the UE and one or more of the Node Bs in the UTRAN.

The radio network controller controls the use and reliability of the radio resources within the RNS 902. Each RNC may also connected to a 3G mobile switching centre 10 (3G MSC) and a 3G serving general packet radio service (GPRS) support node 12 (3G SGSN).

An RNC 904 controls one or more Node B's. An RNC plus its Node B's together make up an RNS 902. A Node B controls one or more cells. Each cell is, at least locally, uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 906 may operate as more than one cell since it may operate at multiple frequencies and/or with multiple scrambling codes.

Figure 10:
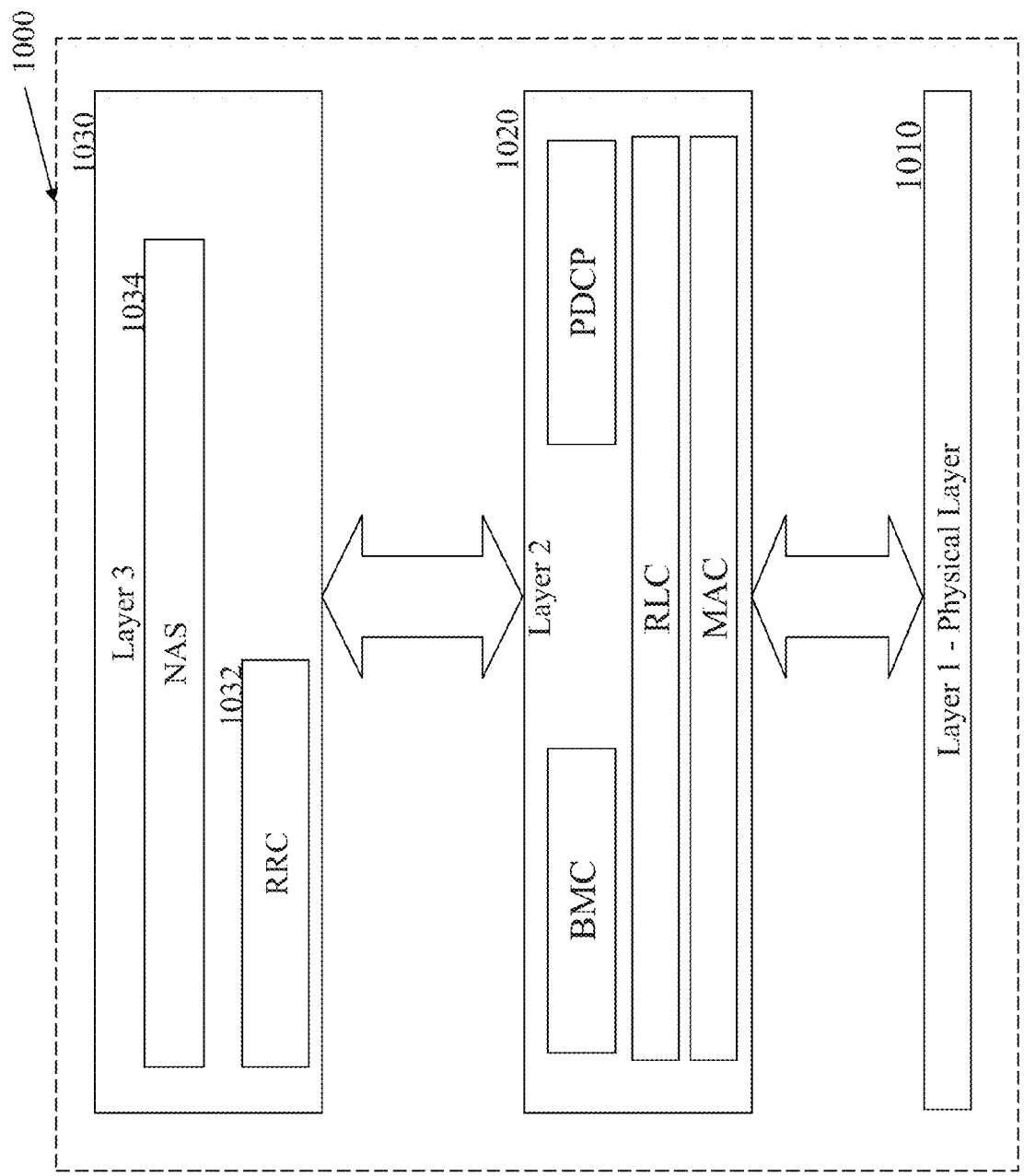
FIG. 10 is a block diagram illustrating an embodiment of a protocol stack provided in a UE device.

FIG. 10 is a block diagram illustrating an embodiment of a protocol stack provided in a UE. A Radio Resource Controller (RRC) block 1032 is a sub layer of Layer 3 1030 of a UMTS protocol stack 1000. The RRC 1032 exists in the control plane only and provides an information transfer service to the non-access stratum NAS 1034. The RRC 1032 is responsible for controlling the configuration of radio interface Layer 1 1010 and Layer 2 1020. When the UTRAN wishes to change the UE configuration it will issue a message to the UE containing a command to invoke a specific RRC procedure. The RRC layer 1032 of the UE decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

The strategies for a method and apparatus for wireless communication as discussed above with reference to the drawings may be implemented by the RRC block 1032.

Figure 11:
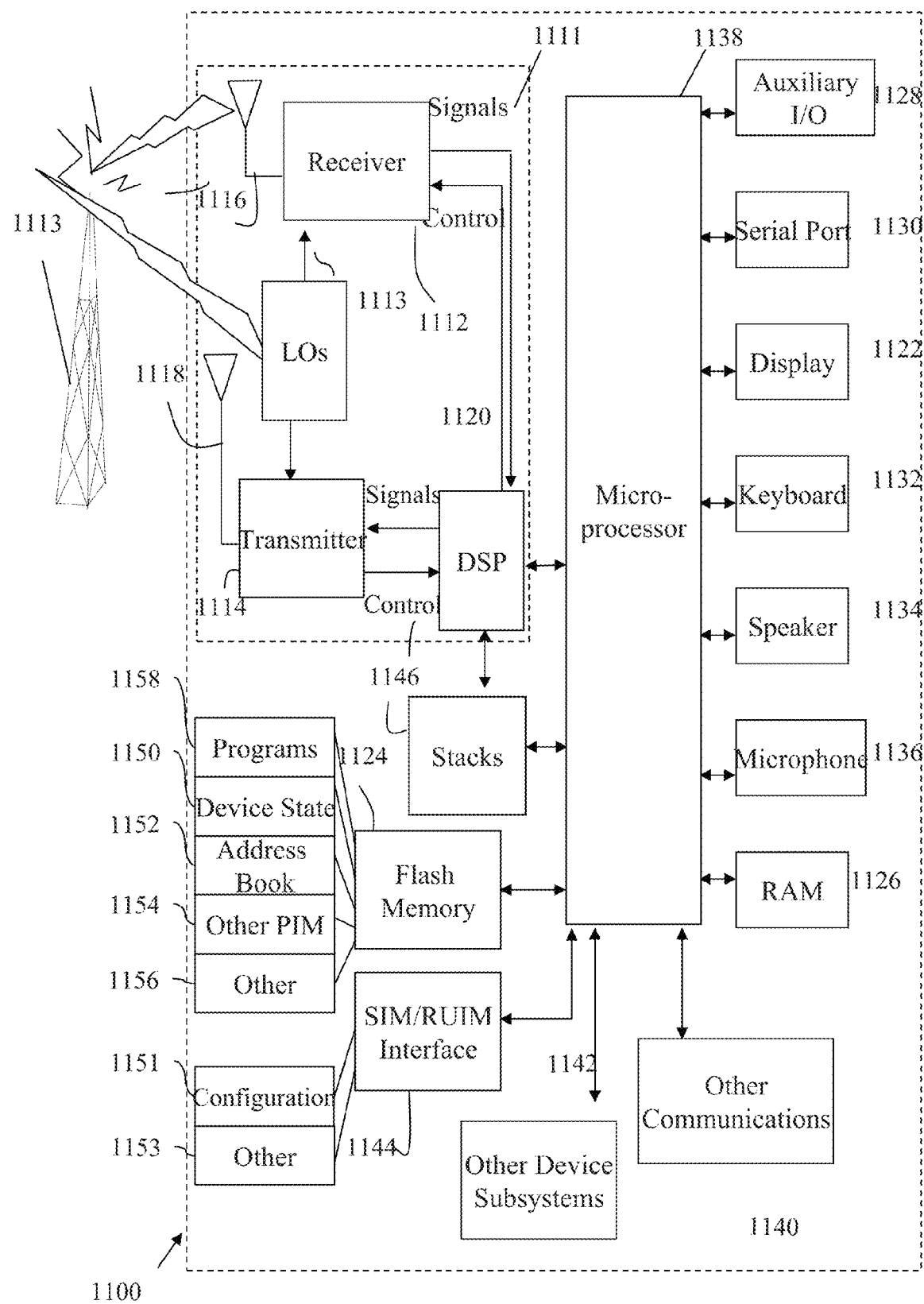
FIG. 11 is a block diagram illustrating a UE device.

Turning now to FIG. 11, FIG. 11 is a block diagram illustrating a mobile device, which can act as a UE and co-operate with the apparatus and methods of FIGS. 1 to 10, and which is an exemplary device. Mobile station 1100 is preferably a two-way wireless communication device. Depending on the exact functionality provided, the wireless device may be referred to as a data messaging device, a two-way pager, a wireless e-mail device, a cellular telephone with data messaging capabilities, a wireless Internet appliance, or a data communication device, as examples.

The UE may include both voice and data capabilities. The UE is for obtaining service (either uplink or downlink or both) in a plurality of cells. Where mobile station 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and processing means such as a processing module such as a digital signal processor (DSP) 1120. As will be apparent to those skilled in the field of communications, the particular design of the communication subsystem 1111 will be dependent upon the communication network in which the device is intended to operate. For example, mobile station 1100 may include a communication subsystem 1111 designed to operate within the Mobitex™ mobile communication system, the DataTAC™ mobile communication system, GPRS network, UMTS network, EDGE network or LTE network.

Network access requirements will also vary depending upon the type of network 1102. For example, in the Mobitex and DataTAC networks, mobile station 1100 is registered on the network using a unique identification number associated with each mobile station. In LTE, UMTS and GPRS networks, however, network access is associated with a subscriber or user of mobile station 1100.

A mobile station may require a subscriber identity module (SIM) or Universal Subscriber Identity Module (USIM) in order to operate. Without a valid SIM, a GPRS mobile station may not be fully functional. Local or non-network communication functions, as well as legally required functions (if any) such as "911" emergency calling, may be available, but mobile station 1100 may be unable to carry out any other functions involving communications over the network 1102. The SIM interface 1144 may be similar to a card-slot into which a SIM card (or card incorporating the USIM) can be inserted and ejected. The SIM or USIM can have 64K of memory or more and hold many key configuration 1151, and other information 1153 such as identification, and subscriber related information.

The SIM or USIM may be able to process communications received via the mobile station or mobile equipment, such as communications from a network which configure subscription parameters associated with the SIM or USIM.

When required network registration or activation procedures have been completed, mobile station 1100 may send and receive communication signals over the network 1102. Signals received by antenna 1116 through communication network 1102 are input to receiver 1112, which may perform such common receiver functions as signal amplification, frequency down conversion, filtering, channel selection and the like, and in the example system shown in FIG. 11, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1102 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Mobile station 1100 preferably includes processing means such as a microprocessor 1138 which controls the overall operation of the device. Communication functions, including at least data and voice communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 11 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile station. A predetermined set of applications that control basic operations, including at least data and voice communication applications for example, will normally be installed on mobile station 1100 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 1102. In a preferred embodiment, the PIM data items are seamlessly integrated, synchronized and updated, via the wireless network 1102, with the mobile station user's corresponding data items stored or associated with a host computer system.

Further applications may also be loaded onto the mobile station 1100 through the network 1102, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the mobile station 1100.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of mobile station 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of mobile station 1100 is similar, except that received signals would preferably be output to a speaker 1134 and signals for transmission would be generated by a microphone 1136. Alternative voice or audio I/O subsystems, such as a voice message recording subsystem, may also be implemented on mobile station 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 11, would normally be implemented in a personal digital assistant (PDA)-type mobile station for which synchronization with a user's desktop computer (not shown) may be desirable, but is an optional device component. Such a port 1130 would enable a user to set preferences through an external device or software application and would extend the capabilities of mobile station 1100 by providing for information or software downloads to mobile station 1100 other than through a wireless communication network. The alternate download path may for example be used to load an encryption key onto the device through a direct and thus reliable and trusted connection to thereby enable secure device communication.

Other communications subsystems 1140, such as a short-range communications subsystem, is a further optional component which may provide for communication between mobile station 1100 and different systems or devices, which need not necessarily be similar devices. For example, the subsystem 1140 may include an infrared device and associated circuits and components or a Bluetooth™ communication module to provide for communication with similarly enabled systems and devices.

When mobile device 1100 is used as a UE, protocol stacks 1146 include a method and apparatus for wireless communication.

EXTENSIONS AND ALTERNATIVES

In the foregoing specification, concepts has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or UTRAN or other user equipment or access network components, a combination of multiple such components for example in communication with one another or a sub-network or full network of such components.

In one example there is provided a method in a device, and in another example, a wireless device.

Embodiments have been described herein in relation to 3GPP specifications. However the method and apparatus described are not intended to be limited to the specifications or the versions thereof referred to herein but may be applicable to future versions or other specifications.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

We claim:

1. A method in a wireless device, comprising:
   monitoring a neighbour cell at a time interval; and
   if a criterion is satisfied relating to a previous reselection or selection activity of the device, increasing the time interval at which the neighbour cell is monitored; in which the criterion relates to:
   a day, or time of day;
   measurements of a cell the device is camped on;
   neighbour cell measurements;
   a message received from a network within which the device is operable;
   measurements of a cell upon which the device is camped;
   currently or previously, time collectively and/or continuously camped on a cell within a predetermined time interval;
   a speed of a past reselection;
   within a time interval, reselection to a cell Y being relatively frequent and/or reselection to a cell Z being relatively infrequent; or
   whether the device is stationary, in which stationary comprises physically stationary, sufficiently small movement to be servable by a single cell, or being unlikely to perform reselection.

2. The method of claim 1, in which the criterion is a predetermined criterion.

3. The method of claim 1, in which when monitoring the neighbour cell, the device is camped on a cell.

4. The method of claim 1, further including
   determining a home cell or a home region for the device, a home cell or home region comprising a cell or a region that the device, currently or previously, has been camped on, or remained within, for longer than a collective and/or continuous period; or
   in relation to which the device has relatively low mobility; or
   when camped on or remaining in, the device is associated with relatively low data transfer.

5. The method of claim 1, further including
   determining a home cell or a home region for the device, a home cell or home region comprising a cell or a region that the device, currently or previously, has been camped on, or remained within, for longer than a collective and/or continuous period; or
   in relation to which the device has relatively low mobility; or
   when camped on or remaining in, the device is associated with relatively low data transfer;
   in which the criterion comprises
   the device being camped on the home cell, or remaining within the home region.

6. The method of claim 1, in which
   determining a home cell or a home region for the device, a home cell or home region comprising a cell or a region that the device, currently or previously, has been camped on, or remained within, for longer than a collective and/or continuous period; or
   in relation to which the device has relatively low mobility; or
   when camped on or remaining in, the device is associated with relatively low data transfer;
   in which the region comprises a geographical region defined by positioning measurements,
   coverage of a plurality of cells and/or transmitters; and/or
   an unlicensed spectrum access point coverage area.

7. The method of claim 1, in which the criterion relates to the device being camped on a cell for more than a period of time.

8. The method of claim 1, in which the previous reselection or selection activity includes, within a time interval, reselection to a cell Y being relatively frequent and/or reselection to a cell Z being relatively infrequent; and in which
   increasing the time interval at which the neighbour cell is monitored comprises
   increasing the time interval of monitoring at least one neighbour cell other than cell Y; and/or increasing the time interval of monitoring of cell Z.

9. The method of claim 1, in which
   the increasing and/or modifying is dependent upon the signal quality and/or strength of a cell the device is camped on, or data received, or expected to be received.

10. A non-transitory data carrier carrying data comprising instructions executable by processing means to cause those means to carry out a method according to claim 1.

11. A non-transitory computer readable medium having computer executable instructions adapted to cause the device to perform a method of claim 1.

12. The medium of claim 11, in which the criterion is a predetermined criterion.

13. The medium of claim 11, in which when monitoring the neighbour cell, the device is camped on a cell.

14. The medium of claim 11, further including
   determining a home cell or a home region for the device, a home cell or home region comprising a cell or a region that the device, currently or previously, has been camped on, or remained within, for longer than a collective and/or continuous period; or
   in relation to which the device has relatively low mobility; or
   when camped on or remaining in, the device is associated with relatively low data transfer.

15. The medium of claim 11, further including
   determining a home cell or a home region for the device, a home cell or home region comprising a cell or a region that the device, currently or previously, has been camped on, or remained within, for longer than a collective and/or continuous period; or in relation to which the device has relatively low mobility; or when camped on or remaining in, the device is associated with relatively low data transfer;

in which the criterion comprises the device being camped on the home cell, or remaining within the home region.

16. The medium of claim 11, in which determining a home cell or a home region for the device, a home cell or home region comprising a cell or a region that the device, currently or previously, has been camped on, or remained within, for longer than a collective and/or continuous period; or in relation to which the device has relatively low mobility; or when camped on or remaining in, the device is associated with relatively low data transfer;

in which the region comprises a geographical region defined by positioning measurements, coverage of a plurality of cells and/or transmitters; and/or an unlicensed spectrum access point coverage area.

17. The medium of claim 11, in which the criterion relates to the device being camped on a cell for more than a period of time.

18. The medium of claim 11, in which the previous reselection or selection activity includes, within a time interval, reselection to a cell Y being relatively frequent and/or reselection to a cell Z being relatively infrequent; and in which increasing the time interval at which the neighbour cell is monitored comprises increasing the time interval of monitoring at least one neighbour cell other than cell Y; and/or increasing the time interval of monitoring of cell Z.

19. The medium of claim 11, in which the increasing and/or modifying is dependent upon the signal quality and/or strength of a cell the device is camped on, or data received, or expected to be received.

20. A wireless device configured to:

monitor a neighbour cell at a time interval; and if a criterion is satisfied relating to a previous reselection or selection activity of the device, increase the time interval at which the neighbour cell is monitored; in which the criterion relates to:

a day, or time of day;

measurements of a cell the device is camped on;

neighbour cell measurements;

a message received from a network within which the device is operable;

measurements of a cell upon which the device is camped;

currently or previously, time collectively and/or continuously camped on a cell within a predetermined time interval;

a speed of a past reselection;

within a time interval, reselection to a cell Y being relatively frequent and/or reselection to a cell Z being relatively infrequent; or whether the device is stationary, in which stationary comprises physically stationary, sufficiently small movement to be servable by a single cell, or being unlikely to perform reselection.

21. The device of claim 20, in which the criterion is a predetermined criterion.

22. The device of claim 20, in which when monitoring the neighbour cell, the device is camped on a cell.

23. The device of claim 20, further configured to determine a home cell or a home region for the device, a home cell or home region comprising a cell or a region that the device, currently or previously, has been camped on, or remained within, for longer than a collective and/or continuous period; or in relation to which the device has relatively low mobility; or when camped on or remaining in, the device is associated with relatively low data transfer.

24. The device of claim 20, further configured to determine a home cell or a home region for the device, a home cell or home region comprising a cell or a region that the device, currently or previously, has been camped on, or remained within, for longer than a collective and/or continuous period; or in relation to which the device has relatively low mobility; or when camped on or remaining in, the device is associated with relatively low data transfer;

in which the criterion comprises the device being camped on the home cell, or remaining within the home region.

25. The device of claim 20, further configured to determine a home cell or a home region for the device, a home cell or home region comprising a cell or a region that the device, currently or previously, has been camped on, or remained within, for longer than a collective and/or continuous period; or in relation to which the device has relatively low mobility; or when camped on or remaining in, the device is associated with relatively low data transfer;

in which the region comprises a geographical region defined by positioning measurements, coverage of a plurality of cells and/or transmitters; and/or an unlicensed spectrum access point coverage area.

26. The device of claim 20, in which the criterion relates to the device being camped on a cell for more than a period of time.

27. The device of claim 20, in which the previous reselection or selection activity includes, within a time interval, reselection to a cell Y being relatively frequent and/or reselection to a cell Z being relatively infrequent; and in which increasing the time interval at which the neighbour cell is monitored comprises increasing the time interval of monitoring at least one neighbour cell other than cell Y; and/or increasing the time interval of monitoring of cell Z.

28. The device of claim 20, in which the increase and/or modifying is dependent upon the signal quality and/or strength of a cell the device is camped on, or data received, or expected to be received.

29. A method in a wireless device, comprising:

monitoring a neighbour cell at a time interval; and if a criterion is satisfied relating to a previous reselection or selection activity of the device, increasing the time interval at which the neighbour cell is monitored; the method further comprising determining a home cell or a home region for the device, a home cell or home region comprising a cell or a region that the device, currently or previously, has been camped on, or remained within, for longer than a collective and/or continuous period; or in relation to which the device has relatively low mobility; or when camped on or remaining in, the device is associated with relatively low data transfer.

30. A wireless device configured to:
monitor a neighbour cell at a time interval; and
if a criterion is satisfied relating to a previous reselection or selection activity of the device,
increase the time interval at which the neighbour cell is monitored; the device further configured to
determine a home cell or a home region for the device, a home cell or home region comprising a cell or a region that the device, currently or previously, has been camped on, or remained within, for longer than a collective and/or continuous period; or
in relation to which the device has relatively low mobility; or
when camped on or remaining in, the device is associated with relatively low data transfer.

31. The data carrier of claim 30, in which the criterion is a predetermined criterion.

32. The data carrier of claim 30, in which when monitoring the neighbour cell, the device is camped on a cell.

33. The data carrier of claim 30, further including
determining a home cell or a home region for the device, a home cell or home region comprising a cell or a region that the device, currently or previously, has been camped on, or remained within, for longer than a collective and/or continuous period; or
in relation to which the device has relatively low mobility; or
when camped on or remaining in, the device is associated with relatively low data transfer.

34. The data carrier of claim 30, further including
determining a home cell or a home region for the device, a home cell or home region comprising a cell or a region that the device, currently or previously, has been camped on, or remained within, for longer than a collective and/or continuous period; or
in relation to which the device has relatively low mobility; or
when camped on or remaining in, the device is associated with relatively low data transfer;
in which the criterion comprises
the device being camped on the home cell, or remaining within the home region.

35. The data carrier of claim 30, in which
determining a home cell or a home region for the device, a home cell or home region comprising a cell or a region that the device, currently or previously, has been camped on, or remained within, for longer than a collective and/or continuous period; or
in relation to which the device has relatively low mobility; or
when camped on or remaining in, the device is associated with relatively low data transfer;
in which the region comprises a geographical region defined by positioning measurements,
coverage of a plurality of cells and/or transmitters; and/or an unlicensed spectrum access point coverage area.

36. The data carrier of claim 30, in which the criterion relates to the device being camped on a cell for more than a period of time.

37. The data carrier of claim 30, in which the previous reselection or selection activity includes, within a time interval, reselection to a cell Y being relatively frequent and/or reselection to a cell Z being relatively infrequent; and in which
increasing the time interval at which the neighbour cell is monitored comprises
increasing the time interval of monitoring at least one neighbour cell other than cell Y; and/or increasing the time interval of monitoring of cell Z.

38. The data carrier of claim 30, in which
the increasing and/or modifying is dependent upon the signal quality and/or strength of a cell the device is camped on, or data received, or expected to be received.

* * * * *